US012457571B2

(12) United States Patent
Kim et al.

(10) Patent No.: US 12,457,571 B2
(45) Date of Patent: Oct. 28, 2025

(54) METHOD AND APPARATUS FOR INSTRUCTIONS REGARDING TIME AND FREQUENCY OFFSET IN COMMUNICATION SYSTEM

(71) Applicant: Samsung Electronics Co., Ltd., Gyeonggi-do (KR)

(72) Inventors: Younsun Kim, Gyeonggi-do (KR); Jeongho Yeo, Gyeonggi-do (KR); Jinkyu Kang, Gyeonggi-do (KR); Hyunseok Ryu, Gyeonggi-do (KR); Taehan Bae, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 326 days.

(21) Appl. No.: 17/920,945

(22) PCT Filed: Apr. 29, 2021

(86) PCT No.: PCT/KR2021/005435
§ 371 (c)(1),
(2) Date: Oct. 24, 2022

(87) PCT Pub. No.: WO2021/221477
PCT Pub. Date: Nov. 4, 2021

(65) Prior Publication Data
US 2023/0180164 A1 Jun. 8, 2023

(30) Foreign Application Priority Data

Apr. 29, 2020 (KR) .......................... 10-2020-0052841

(51) Int. Cl.
*H04W 56/00* (2009.01)
*H04B 7/185* (2006.01)

(52) U.S. Cl.
CPC .... *H04W 56/0045* (2013.01); *H04B 7/18513* (2013.01)

(58) Field of Classification Search
None
See application file for complete search history.

(56) References Cited

U.S. PATENT DOCUMENTS

| 10,638,442 B2 | 4/2020 | Kim et al. |
| 2003/0147362 A1 | 8/2003 | Dick et al. |
| 2020/0028541 A1* | 1/2020 | Myers ................ H04B 7/18595 |

FOREIGN PATENT DOCUMENTS

| KR | 10-2019-0017707 | 2/2019 |
| KR | 10-2021-0126465 | 10/2021 |

OTHER PUBLICATIONS

PCT/ISA/210 Search Report issued on PCT/KR2021/005435, Aug. 10, 2021 pp. 5.

(Continued)

*Primary Examiner* — Khalid W Shaheed
(74) *Attorney, Agent, or Firm* — The Farrell Law Firm, P.C.

(57) ABSTRACT

The present disclosure relates to a communication technology for combining, with IoT technology, a 5G communication system for supporting a higher data transmission rate than a 4G system, and to a system therefor. The present disclosure may be applied to intelligent services, such as smart homes, smart buildings, smart cities, smart cars or connected cars, health care, digital education, retail, and security and safety related services, on the basis of 5G communication technologies and IoT-related technologies. The present invention may provide a method and apparatus by which a base station provides instructions on time and (Continued)

frequency offset information to a UE so as to correct the time and frequency by a value offset from the provided time and frequency offset information.

11 Claims, 38 Drawing Sheets

(56) References Cited

OTHER PUBLICATIONS

PCT/ISA/237 Written Opinion issued on PCT/KR2021/005435, Aug. 10, 2021, pp. 3.
Ericsson, 3GPP TSG-RAN WG1 Meeting #99 R1-1912725 Reno, USA, Nov. 17, 2019, "On NTN synchronization, random access, and timing advance", pp. 24.
ZTE Corporation, Sanechips, 3GPP TSG RAN WG2 Meeting #105bis R2-1903391 Xi'an, China, Mar. 28, 2019, "Consideration on Random Access for NTN", pp. 10.
"Discussion on Doppler compensation, timing advance and RACH for NTN", Aug. 17, 2019, pp. 38.
ZTE Corporation, Sanechips, 3GPP TSG RAN WG2 Meeting #106 R2-1906114 Reno, USA, "Remaining issue on RACH for NTN", May 2, 2019, pp. 8.
Huawei, HiSilicon, "Discussion on Doppler Compensation, Timing Advance and RACH for NTN", R1-1910064, 3GPP TSG RAN WG1 Meeting #98bis, Oct. 14-20, 2019, 8 pages.
European Search Report dated Sep. 6, 2023 issued in counterpart application No. 21797728.9-1206, 11 pages.

\* cited by examiner

| Orbit type | Height | Period |
|---|---|---|
| LEO | 500~1000 km | 90~120 min |
| MEO | 5000~15000 km | Approx 6 hours |
| GEO | Approx 36,000 km | Approx 24 hours |

- Link budget between UE and satellite

- Path loss : (1600)
    $FSPL(d, f_c) = 32.45 + 20 \log_{10}(f_c) + 20 \log_{10}(d)$

- Rx antenna gain for UL : 24 dBi (LEO), 45.5 dBi (GEO)

- Link budget between UE and terrestrial gNB

- Path loss (LOS) : (1610)
    $PL_2 = 28.0 + 40 \log_{10}(d_{3D}) + 20 \log_{10}(f_c) - 9 \log_{10}((d'_{BP})^2 + (h_{BS} - h_{UT})^2)$

- Path loss (NLOS) : (1620)
    $PL'_{UMa-NLOS} = 13.54 + 39.08 \log_{10}(d_{3D}) + 20 \log_{10}(f_c) - 0.6 (h_{UT} - 1.5)$

- Rx antenna gain for UL : ~12 dBi

Figure 6.1.5.-3: MAC RAR

| Time (second) | 0 | 200 | 400 | 600 | 800 |
|---|---|---|---|---|---|
| Altitude angle θ | 0° | 16.9° | 76.1° | 156.4° | 177.0° |
| UE-base station radio RTT | 40.9 ms | 23.1 ms | 9.6 ms | 19.2 ms | 36.8 ms |

Satellite altitude 700 km

Satellite movement according to track (846 seconds based on 700 km satellite)

Horizon

METHOD AND APPARATUS FOR INSTRUCTIONS REGARDING TIME AND FREQUENCY OFFSET IN COMMUNICATION SYSTEM

PRIORITY

This application is a National Phase Entry of PCT International Application No. PCT/KR2021/005435, which was filed on Apr. 29, 2021, and claims priority to Korean Patent Application No. 10-2020-0052841, which was filed on Apr. 29, 2020, the entire content of each of which is incorporated herein by reference.

TECHNICAL FIELD

The disclosure relates to a communication system, and particularly, in case that a UE transmits and receives signals to and from a base station through a satellite, big shift may occur in time and frequency, and thus it may be necessary to correct time and frequency offsets. Accordingly, the disclosure provides a method and an apparatus, in which a base station instructs a UE time and frequency offset information, and the UE performs correction as much as an offset value from the instructed information.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE system." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, technical development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet is evolving from a human-centered connection network where humans generate and consume information to an Internet of Things (IoT) network that exchanges and processes information between distributed components such as things. The Internet of everything (IoE), which is a combination of IoT technology and big data processing technology through connection with a cloud server, has also emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently being studied. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to the 5G communication technology.

Application of a cloud radio access network (cloud RAN) as the above-described big data processing technology may also be considered to be an example of convergence between the 5G technology and the IoT technology.

In the late 2010s and into the 2020s, as satellite launch costs are remarkably reduced, companies that intend to provide communication services through satellites have been growing. Accordingly, a satellite network has been raised as a next generation network system that supplements the existing terrestrial network. The satellite network is unable to provide user experiences at the level of the terrestrial network, but has the advantage that it can provide a communication service in an area where it is difficult to establish the terrestrial network or in a disaster situation, and as described above, it can even secure economic feasibility due to the recent sharp reduction of the satellite launch costs. Further, some enterprises and the 3GPP standardization group are now propelling direct communication between a smart phone and a satellite.

DISCLOSURE OF INVENTION

Technical Problem

In case that a UE intends to connect to a base station through a satellite, a large latency occurs until radio waves arrive due to long distances of several hundreds or several thousands or more of kilometers between the UE and the satellite and between the satellite and the base station on the ground. Such a large latency is much greater than that in a situation where the UE and the base station perform the direct communication in the terrestrial network. Further, due to a continuous movement of the satellite, the latency is changed as time goes on. Each of all UEs has a changed latency against the satellite or the base station. Further, with the movement of the satellite, the frequencies of transmitted or received signals are shifted, and this may be caused by a Doppler shift due to the movement of the satellite.

The disclosure relates to a communication system, and in particular, provides a method and an apparatus in which a base station instructs times and frequency offsets, and based on this, a UE performs correction in order to correct the time-varying latency and frequency shift occurring depending on the long distance to the satellite and the movement of the satellite in case that the UE transmits and receives signals to and from the base station through the satellite.

Solution to Problem

According to an embodiment of the disclosure to achieve the above-described technical subject matter, a method by a UE in a communication system may include: receiving, from a base station, information on a change rate of a timing advance (TA) or a frequency offset; determining the timing advance or the frequency offset for an uplink transmission based on the information on the change rate of the timing advance or the frequency offset; and transmitting the uplink transmission to the base station by applying the determined timing advance, wherein the information on the change rate of the timing advance or the frequency offset includes information on a period and a time to which the change rate is applied.

According to an embodiment, the timing advance for the uplink transmission may be determined based on a value commonly applied to UEs located within the same beam in determining the timing advance, and the commonly applied value may be received from the base station through system information.

According to an embodiment, the frequency offset for the uplink transmission may be determined based on a frequency unit that is determined in accordance with subcarrier spacing.

According to an embodiment, the frequency offset for the uplink transmission may be determined based on a value commonly applied to UEs located within the same beam in determining the frequency offset, and the commonly applied value may be received from the base station through system information.

According to an embodiment of the disclosure, a method by a base station in a communication system may include: transmitting, to a UE, information on a change rate of a timing advance (TA) or a frequency offset; and receiving, from the UE, an uplink transmission transmitted by applying the timing advance or the frequency offset determined based on the information on the change rate of the timing advance or the frequency offset, wherein the information on the change rate of the timing advance or the frequency offset includes information on a period and a time to which the change rate is applied.

According to an embodiment of the disclosure, a UE in a communication system may include: a transceiver; and a controller configured to: receive, from a base station, information on a change rate of a timing advance (TA) or a frequency offset, determine the timing advance or the frequency offset for an uplink transmission based on the information on the change rate of the timing advance or the frequency offset, and transmit the uplink transmission to the base station by applying the determined timing advance or frequency offset, wherein the information on the change rate of the timing advance or the frequency offset includes information on a period and a time to which the change rate is applied.

According to an embodiment of the disclosure, a base station in a communication system may include: a transceiver; and a controller configured to: transmit, to a UE, information on a change rate of a timing advance (TA) or a frequency offset, and receive, from the UE, an uplink transmission transmitted by applying the timing advance or the frequency offset determined based on the information on the change rate of the timing advance or the frequency offset, wherein the information on the change rate of the timing advance or the frequency offset includes information on a period and a time to which the change rate is applied.

Advantageous Effects of Invention

As described above, by using the disclosure, the UE can access the base station through the satellite, and it is possible to send and receive signals between the base station and the UE in a manner that the base station instructs the time and frequency offsets to the UE, and the UE corrects the offsets.

BRIEF DESCRIPTION OF DRAWINGS

FIG. 34 is a diagram illustrating that a round-trip propagation latency between a UE and a base station is changed while a satellite moves along an orbit as time goes on.

MODE FOR THE INVENTION

Figure 1:
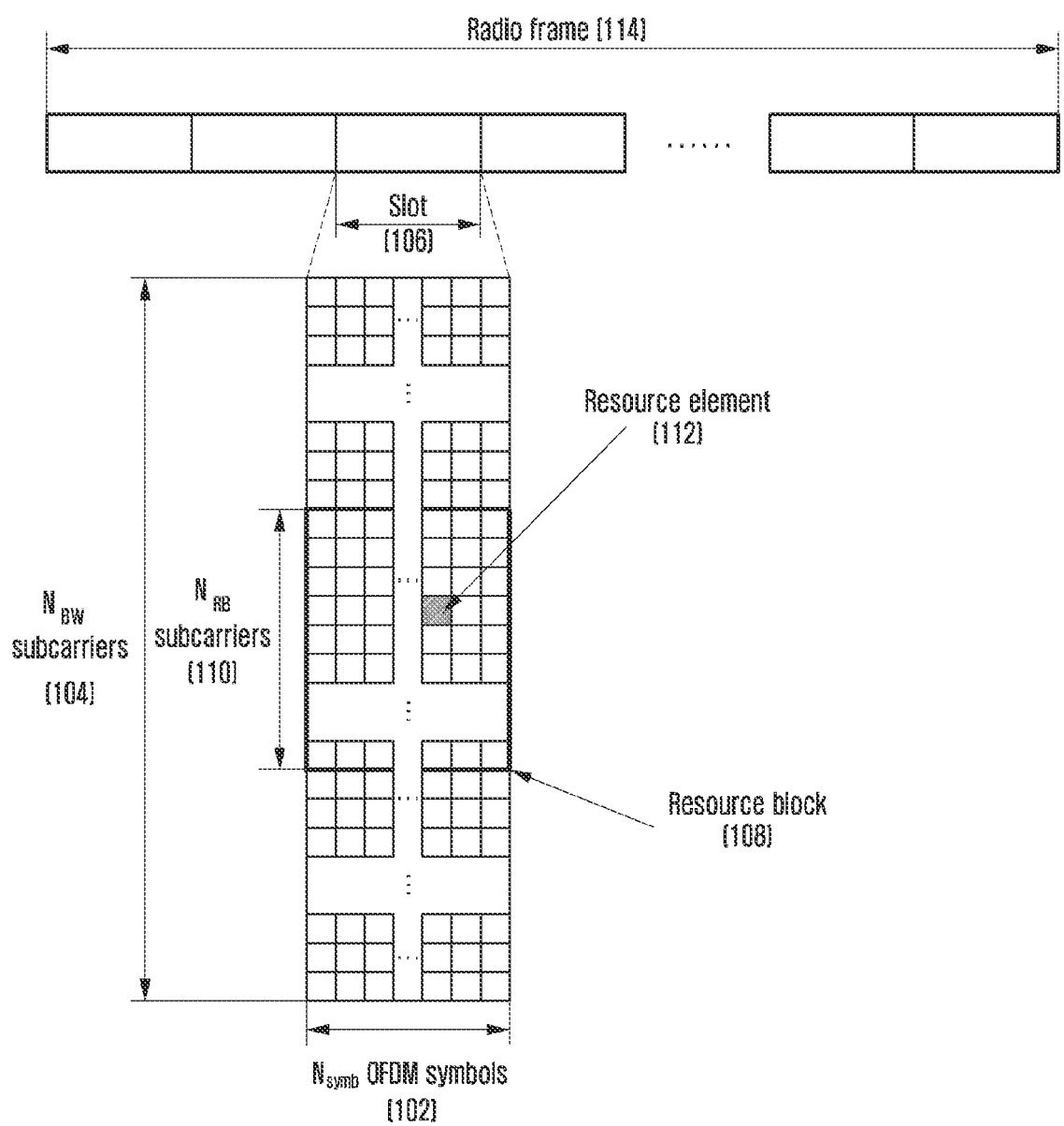
FIG. 1 is a diagram illustrating the basic structure of a time-frequency domain that is a radio resource area in which data or a control channel is transmitted on a downlink or an uplink in an NR system.

New radio access technology (NR) that is a new 5G communication has been designed so that various services can be freely multiplexed on time and frequency resources, and accordingly, waveform/numerology and reference signals can be dynamically or freely allocated as the corresponding services are required. In wireless communication, in order to provide an optimum service to a UE, it is important to transmit optimized data through measurement of a channel quality and an amount of interference, and thus it is essential to measure an accurate channel state. However, in case of a 5G channel, unlike 4G communication in which channel and interference characteristics are not greatly changed depending on the frequency resources, the channel and interference characteristics are greatly change in accordance with the services, and thus it is necessary to support subsets of a frequency resource group (FRG) dimension so as to divide and measure the channel and interference characteristics. Meanwhile, in the NR system, types of supported services may be divided into categories of enhanced mobile broadband (eMBB), massive machine type communications (mMTC), and ultra-reliable and low-latency communications (URLLC). The eMBB may be considered as a service aiming at high-speed transmission of high-capacity data, the mMTC may be considered as a service aiming at UE power minimization and multiple UEs' accesses, and the URLLC may be considered as a service aiming at high reliability and low latency. Different requirements may be applied depending on the types of services being applied to the UE.

In such a communication system, a plurality of services may be provided to a user, and in order to provide the plurality of services to the user, a method capable of providing respective services in the same time interval to match their features and an apparatus using the method are demanded. Hereinafter, embodiments of the disclosure will be described in detail with reference to the accompanying drawings.

In describing the embodiments, explanation of technical contents that are well known in the technical field to which the disclosure pertains and are not directly related to the disclosure will be omitted. This is to transfer the subject matter of the disclosure more clearly without obscuring the same through omission of unnecessary explanations.

For the same reason, in the accompanying drawings, some constituent elements are exaggerated, omitted, or briefly illustrated. Further, sizes of the respective constituent elements do not completely reflect the actual sizes thereof, and in the drawings, the same reference numerals are used for the same or corresponding constituent elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the embodiments of the disclosure are only specific details provided to assist those of ordinary skill in the art in a comprehensive understanding of the disclosure, and the disclosure is only defined within the scope of the appended claims. In the entire description of the disclosure, the same reference numerals are used for the same elements across various figures.

In this case, it will be understood that each block of the flowchart illustrations, and combinations of blocks in the flowchart illustrations, can be performed by computer program instructions. These computer program instructions can be provided to a processor of a general purpose computer, special purpose computer, or other programmable data processing apparatus, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions which are executed on the computer or other programmable data processing apparatus provide steps for implementing the functions specified in the flowchart block or blocks. Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Further, in an embodiment, the "~units" may include one or more processors.

A wireless communication system was initially developed for the purpose of providing a voice-oriented service, but has been expanded to, for example, a broadband wireless communication system that provides a high-speed and high-quality packet data service like communication standards, such as 3GPP high speed packet access (HSPA), long term evolution (LTE) or evolved universal terrestrial radio access (E-UTRA), LTE-Advanced (LTE-A), 3GPP2 high rate packet data (HRPD), ultra mobile broadband (UMB), and IEEE 802.16e. Further, as the 5th generation wireless communication system, 5G or new radio (NR) communication standards have been made. In an NR system that is a representative example of the broadband wireless communication systems, a downlink (DL) and an uplink adopt an orthogonal frequency division multiplexing (OFDM) scheme. More specifically, the downlink adopts a cyclic-prefix OFDM (CP-OFDM) scheme, and the uplink (UL) adopts two kinds of schemes including the CP-OFDM scheme and a discrete Fourier transform spreading OFDM (DFT-S-OFDM) scheme. The uplink means a radio link in which a user equipment (UE) or a mobile station (MS) transmits data or a control signal to a base station (gNode B or BS), and the downlink means a radio link in which the base station transmits data or a control signal to the UE. According to the above-described multiple access schemes, typical data of respective users or control information are discriminated from each other by performing an allocation and an operation so as to prevent time-frequency resources for carrying the data or control information for each user from overlapping each other, that is, to establish orthogonality.

The NR system adopts a hybrid automatic repeat request (HARQ) scheme in which a physical layer retransmits the corresponding data if a decoding failure occurs during an initial transmission. According to the HARQ scheme, a receiver may transmit information (negative acknowledgement (NACK)) for notifying a transmitter of the decoding failure if the receiver is unable to accurately decode the data, and the transmitter may make the physical layer retransmit the corresponding data. The receiver may combine the data that is retransmitted by the transmitter with the previous data of which the decoding has failed to enhance the data reception performance. Further, if the receiver has accurately decoded the data, the receiver may transmit information (acknowledgement (ACK)) for notifying the transmitter of a decoding success, and the transmitter can transmit new data. FIG. 1 is a diagram illustrating the basic structure of a time-frequency domain that is a radio resource area in which data or a control channel is transmitted on a downlink or an uplink in an NR system.

In FIG. 1, a horizontal axis represents a time domain, and a vertical axis represents a frequency domain. The minimum transmission unit in the time domain is an OFDM symbol, and Nsymb (102) OFDM symbols are gathered to constitute one slot 106. The length of a subframe is defined as 1.0 ms, and a radio frame 114 is defined as 10 ms. The minimum transmission unit in the frequency domain is a subcarrier, and the bandwidth of the overall system transmission band is composed of total NBW (104) subcarriers. One frame may be defined as 10 ms. One subframe may be defined as 1 ms, and accordingly, one frame may be composed of total 10 subframes. One slot may be defined as 14 OFDM symbols (that is, the number of symbols ($N_{symb}^{slot}$=14) for one slot). One subframe may be composed of one or a plurality of slots, and the number of slots for one subframe may differ depending on a set value g for one subcarrier spacing.

Figure 2A:
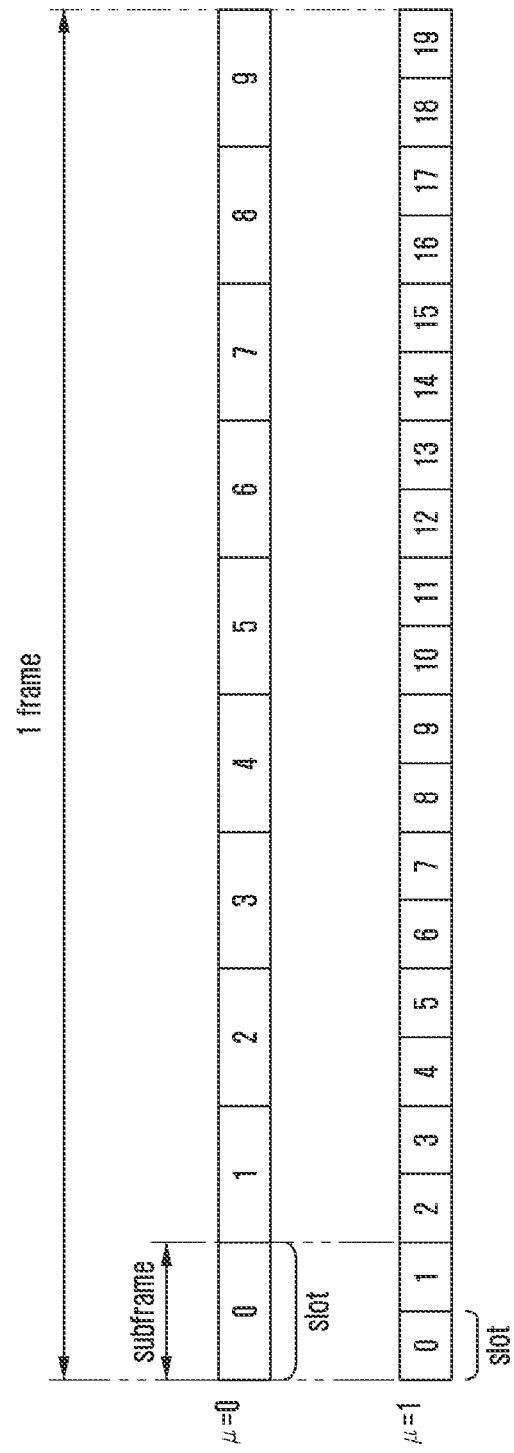
FIG. 2A is a diagram illustrating an example of a slot structure used in a 5G wireless communication system according to an embodiment of the disclosure.

FIG. 2A is a diagram illustrating an example of a slot structure used in a 5G wireless communication system according to an embodiment of the disclosure.

With reference to FIG. 2A, slot structures are illustrated in case of µ=0 and in case of µ=1 as the set values of subcarrier spacing. In case of µ=0, one subframe may be composed of one slot, and in case of µ=1, one subframe may be composed of two slots. That is, depending on the set value µ for the subcarrier spacing, the number $N_{slot}^{subframe,\mu}$ of slots for one subframe may differ, and accordingly, the number $N_{slot}^{frame,\mu}$ of slots for one frame may differ. The $N_{slot}^{subframe,\mu}$ and $N_{slot}^{frame,\mu}$ depending on the subcarrier spacing settings may be defined as in Table 1 below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

A UE before a radio resource control (RRC) connection may be configured with an initial bandwidth part (initial BWP) for an initial access from a base station through a master information block (MIB). More specifically, the UE may receive configuration information on a control resource set (CORESET) and a search space, which can transmit a physical downlink control channel (PDCCH) for receiving system information (corresponding to remaining system information (RMSI) or system information block 1 (SIB1)) required for the initial access through the MIB at an initial access stage. The control resource set and the search space configured by the MIB may be considered as identity (ID) 0. The base station may notify the UE of configuration information, such as frequency allocation information, time allocation information, and numerology, for control resource set #0 through the MIB. Further, the base station may notify the UE of configuration information on a monitoring period and occasion for control resource set #0, that is, configuration information on search space #0, through the MIB. The UE may consider the frequency domain configured as the control resource set #0 obtained from the MIB as an initial bandwidth part for the initial access. In this case, the identifier (ID) of the initial bandwidth part may be considered as 0.

The MIB may include the following information.

| MIB | |
|---|---|
| ASN1START | |
| TAG-MIB-START | |
| MIB ::= | SEQUENCE { |
| systemFrameNumber | BIT STRING (SIZE (6)), |
| subCarrierSpacingCommon | ENUMERATED {scs15or60, scs30or120}, |
| ssb-SubcarrierOffset | INTEGER (0 . . . 15), |
| dmrs-TypeA-Position | ENUMERATED {pos2, pos3}, |
| pdcch-ConfigSIB1 | PDCCH-ConfigSIB1, |
| cellBarred | ENUMERATED [barred, notBarred}, |
| intraFreqReselection | ENUMERATED [allowed, notAllowed}, |
| spare | BIT STRING (SIZE (1)) |
| } | |
| TAG-MIB-STOP | |
| -- ASN1STOP | |

| MIB field descriptions |
|---|
| cellBarred |
| Value barred means that the cell is barred, as defined in TS 38.304 [20]. |
| dmrs-TypeA-Position |
| Position of (first) DM-RS for downlink (see TS 38.211 [16], clause 7.4.1.1.2) and uplink (see TS 38.211 [16], clause 6.4.1.1.3). |
| intraFreqReselection |
| Controls cell selection/reselection to intra-frequency cells when the highest ranked cell is barred, or treated as barred by the UE, as specified in TS 38.304 [20]. |
| pdcch-ConfigSIB1 |
| Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213 [13], clause 13). |
| ssb-SubcarrierOffset |
| Corresponds to kSSB (see TS 38.213 [13]), which is the frequency domain offset between SSB and the overall resource block grid in number of subcarriers. (See TS 38.211 [16], clause 7.4.3.1). The value range of this field may be extended by an additional most significant bit encoded within PBCH as specified in TS 38.213 [13]. This field may indicate that this cell does not provide SIB1 and that there is hence no CORESET#0 configured in MIB (see TS 38.213 [13], clause 13). In this case, the field pdcch-ConfigSIB1 may indicate the frequency positions where the UE may (not) find a SS/PBCH with a control resource set and search space for SIB1 (see TS 38.213 [13], clause 13). |
| subCarrierSpacingCommon |
| Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz. |
| systemFrameNumber |
| The 6 most significant bits (MSB) of the 10-bit System Frame Number (SFN). The 4 LSB of the SFN are conveyed in the PBCH transport block as part of channel coding (i.e. outside the MIB encoding), as defined in clause 7.1 in TS 38.212 [17]. |

In a method for configuring a bandwidth part, UEs before the RRC connection may receive configuration information for an initial bandwidth part through an MIB at an initial access stage. More specifically, the UE may be configured with a control resource set for a downlink control channel on which downlink control information (DCI) for scheduling an SIB from the MIB of a physical broadcast channel (PBCH) may be transmitted. In this case, the bandwidth of the control resource set configured with the MIB may be considered as an initial bandwidth part, and through the configured initial bandwidth part, the UE may receive a physical downlink shared channel (PDSCH) on which the SIB is transmitted. The initial bandwidth part may be utilized for other system information (OSI), paging, and random access in addition to the purpose of receiving the SIB.

In case that one or more bandwidth parts are configured to the UE, the base station may instruct the UE to change the bandwidth part by using a bandwidth part indicator field in the DCI. In time-frequency domain, the basic resource unit is a resource element (RE) 112, and may be represented as an OFDM symbol index and a subcarrier index. A resource block (RB) or a physical resource block (PRB) 108 is defined as $N_{RB}$ (110) continuous subcarriers in the frequency domain. In general, the minimum data transmission unit is the RB unit. In the NR system, it is general that Nsymb and the NRB are 14 and 12, respectively, and an NBW is in proportion to the bandwidth of the system transmission band. In proportion to the number of RBs that are scheduled by the UE, a data rate may be increased.

In the NR system, in case of an FDD system that operates a downlink and an uplink through discrimination by frequencies, the downlink transmission bandwidth and the uplink transmission bandwidth may be different from each other. The channel bandwidth represents an RF bandwidth corresponding to the system transmission bandwidth. Table 2 and Table 3 represent some of correspondences of the system transmission bandwidth, subcarrier spacing, and channel bandwidth defined in the NR system in the frequency band that is lower than 6 GHz and in the frequency band that is higher than 6 GHz. For example, the NR system having 100 MHz channel bandwidth with 30 kHz subcarrier spacing is composed of a transmission bandwidth composed of 273 RBs. In the following, N/A may be a bandwidth-subcarrier combination that is not supported in the NR system.

TABLE 2

Configuration of frequency range 1 (FR1)

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 3

Configuration of frequency range 2 (FR2)

| Channel bandwidth BWChannel [MHz] | Subcarrier width | 50 MHz | 100 MHz | 200 MHz | 400 MHz |
|---|---|---|---|---|---|
| Transmission bandwidth configuration NRB | 60 kHz | 66 | 132 | 264 | N/A |
| | 120 kHz | 32 | 66 | 132 | 264 |

In the NR system, the frequency range may be defined to be divided into FR1 and FR2 as in Table 4 below.

TABLE 4

| Frequency range designation | Corresponding frequency range |
|---|---|
| FR1 | 450 MHz-7125 MHz |
| FR2 | 24250 MHz-52600 MHz |

As described above, it may be possible that the ranges of FR1 and FR2 are differently changed and applied. As an example, the frequency range of FR1 may be changed and applied from 450 MHz to 6000 MHz.

Next, a synchronization signal (SS)/PBCH block in 5G will be described.

The SS/PBCH block may mean a physical layer channel block composed of a primary SS (PSS), a secondary SS (SSS), and a PBCH. Specifically, it may be as follows.

PSS: This is a signal that becomes the basis of downlink time/frequency synchronization, and provides some information of a cell ID.

SSS: This becomes the basis of downlink time/frequency synchronization, and provides remaining cell ID information that is not provided by the PSS. In addition, this may serve as a reference signal for demodulation of the PBCH.

PBCH: This provides essential system information that is necessary for transmission and reception of a data channel and a control channel of the UE. The essential system information may include search space related control information representing radio resource mapping information of the control channel and scheduling control information for a separate data channel for transmitting the system information.

SS/PBCH block: The SS/PBCH block is composed of a combination of the PSS, SSS, and PBCH.

One or a plurality of SS/PBCH blocks may be transmitted in a time of 5 ms, and the respective SS/PBCH blocks being transmitted may be discriminated by indexes.

The UE may detect the PSS and SSS at the initial access stage, and may decode the PBCH. The UE may obtain the MIB from the PBCH, and from this, may be configured with control resource set #0 (corresponding to the control resource set of which the control resource set index is 0).

The UE may perform monitoring of the control resource set #0 on the assumption that a demodulation reference signal (DMRS) being transmitted from the selected SS/PBCH block and the control resource set #0 is quasi-co-located (QCLed). The UE may receive the system information through the downlink control information transmitted from the control resource set #0. The UE may obtain random access channel (RACH) related configuration information that is necessary for the initial access from the received system information. The UE may transmit a physical RACH (PRACH) to the base station in consideration of the selected SS/PBCH block index, and the base station having received the PRACH may obtain information on the SS/PBCH block index selected by the UE. Through such a process, the base station may be able to know which block among the SS/PBCH blocks the UE selects, and the fact that the UE monitors control resource set #0 related to the selected block.

Next, downlink control information (DCI) in a 5G system will be described in detail.

In the 5G system, scheduling information on uplink data (or physical uplink shared channel (PUSCH)) or downlink data (or physical downlink shared channel (PDSCH)) is transferred from the base station to the UE through the DCI. The UE may monitor a fallback DCI format and a non-fallback DCI format with respect to the PUSCH or PDSCH. The fallback DCI format may be composed of a fixed field predefined between the base station and the UE, and the non-fallback DCI format may include a configurable field. In addition, in the DCI, several formats exist, and in accordance with the respective formats, it may be represented whether the DCI is the DCI for power control or the DCI for notifying of a slot format indicator (SFI).

The DCI may be transmitted on the PDCCH that is the physical downlink control channel through a channel coding and modulation process. A cyclic redundancy check (CRC) may be attached to a DCI message payload, and the CRC may be scrambled by a radio network temporary identifier (RNTI) corresponding to the identity of the UE. In accordance with the purpose of the DCI message, for example, UE-specific data transmission, power control command, or random access response, different RNTIs may be used. That is, the RNTI is not explicitly transmitted, but is transmitted to be included in a CRC calculation process. If the DCI message that is transmitted on the PDCCH is received, the UE identifies the CRC by using the allocated RNTI, and if the result of the CRC identification is correct, the UE may be aware that the corresponding message has been transmitted to the UE. The PDCCH is mapped onto a control resource set (CORESET) configured to the UE to be transmitted.

For example, the DCI that schedules the PDSCH for the system information (SI) may be scrambled by SI-RNTI. The DCI that schedules the PDSCH for a random access response (RAR) message may be scrambled by RA-RNTI. The DCI that schedules the PDSCH for a paging message may be scrambled by P-RNTI. The DCI that notifies of a slot format indicator (SFI) may be scrambled by SFI-RNTI. The DCI that notifies of a transmit power control (TPC) may be scrambled by TPC-RNTI. The DCI that schedules the UE-specific PDSCH or PUSCH may be scrambled by cell RNTI (C-RNTI).

DCI format 0_0 may be used as fallback DCI that schedules the PUSCH, and in this case, CRC may be scrambled by C-RNTI. The DCI format 0_0 in which the CRC is scrambled by the C-RNTI may include, for example, the following information.

TABLE 5

Identifier for DCI formats - [1] bit
Frequency domain resource assignment -
$\lceil \log_2( N_{RB}^{UL,BWP}(N_{RB}^{UL,BWP} + 1)/2) \rceil$ ] bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
- UL/SUL indicator - 0 or 1 bit DCI format 01 may be used as non-fallback DCI that schedules the PUSCH, and in this case, CRC may be scrambled by C-RNTI. The DCI format 0_1 in which CRC is scrambled by C-RNTI may include, for example, the following information.

TABLE 6

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0(자원 할당 타입 0의 경우), $[N_{RB}^{UL,BWP}/P]$ bits
For resource allocation type 1(자원 할당 타입 1의), $[\log_2(N_{RB}^{UL,BWP}(N_{RB}^{UL,BWP} + 1)/2)]$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits SRS resource indicator - $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission.

$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used as fallback DCI that schedules the PDSCH, and in this case, CRC may be scrambled by C-RNTI. The DCI format 1_0 in which the CRC is scrambled by the C-RNTI may include, for example, the following information.

TABLE 7

Identifier for DCI formats - [1] bit
Frequency domain resource assignment -
[[log$_2$( N$_{RB}^{DL,BWP}$(N$_{RB}^{DL,BWP}$ + 1)/2)] ] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
- PDSCH-to-HARQ feedback timing indicator - [3] bits DCI format 1_1 may be use as non-fallback DCI that schedules the PDSCH, and in this case, CRC may be scrambled by C-RNTI. The DCI format 1_1 in which the CRC is scrambled by C-RNTI may include, for example, the following information.

TABLE 8

Carrier indicator - 0 or 3 bits
Identifier for DCI formats - [1] bits
Bandwidth part indicator - 0, 1 or 2 bits
Frequency domain resource assignment
For resource allocation type 0, [N$_{RB}^{DL, BWP}$/P] bits
For resource allocation type 1, [log$_2$(N$_{RB}^{DL, BWP}$(N$_{RB}^{DL, BWP}$ + 1)/2)] bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit Hereinafter, a time domain resource allocation method or a data channel in a communication system will be described.

The base station may configure, to the UE, a table for time domain resource allocation information for the downlink data channel (PDSCH) and the uplink data channel (PUSCH) through upper layer signaling (e.g., RRC signaling). A table composed of maximally maxNrofDL-Allocations=16 entries may be configured with respect to the PDSCH, and a table composed of maximally maxNrofUL-Allocations=16 entries may be configured with respect to the PUSCH. The time domain resource allocation information may include, for example, PDCCH-to-PDSCH slot timing (corresponding to a time interval of a slot unit between the time when the PDCCH is received and the time when the PDSCH that is scheduled by the received PDCCH is transmitted) (that is denoted by K0), or PDCCH-to-PUSCH slot timing (corresponding to a time interval of a slot unit between the time when the PDCCH is received and the time when the PUSCH that is scheduled by the received PDCCH is transmitted) (that is denoted by K2), information on a location and a length of a start symbol on which the PDSCH or PUSCH is scheduled in a slot, and a mapping type of the PDSCH or PUSCH. For example, information as in Tables 9 and 10 below may be notified from the base station to the UE.

TABLE 9

PDSCH-TimeDomainResourceAllocationList information element

PDSCH-TimeDomainResourceAllocationList ::=   SEQUENCE (SIZE(
1 . . . maxNrofDL-
Allocations)) OF PDSCH-TimeDomainResourceAllocation
PDSCH-TimeDomainResourceAllocation ::=   SEQUENCE {
k0                                 INTEGER(0 . . . 32)
OPTIONAL,   -- Need S
mappingType                        ENUMERATED {typeA,
                                   typeB},
startSymbolAndLength               INTEGER (0 . . . 127)
}

TABLE 10

PUSCH-TimeDomainResourceAllocation information element

PUSCH-TimeDomainResourceAllocationList ::=   SEQUENCE
(SIZE(1..maxNrofUL-
Allocations)) OF PUSCH-TimeDomainResourceAllocation
PUSCH-TimeDomainResourceAllocation ::=   SEQUENCE {
k2                    INTEGER(0 . . . 32)        OPTIONAL,
-- Need S
mappingType           ENUMERATED {typeA, typeB},
startSymbolAndLength  INTEGER (0 . . . 127)
}

The base station may notify the UE of one of entries of the table or the time domain resource allocation information through L1 signaling (e.g., DCI) (e.g., it may be indicated by "time domain resource allocation" field in the DCI). The UE may obtain the time domain resource allocation information for the PDSCH or PUSCH based on the DCI received from the base station. Hereinafter, a downlink control channel in a 5G communication system will be described in more detail with reference to the drawings.

Figure 2B:
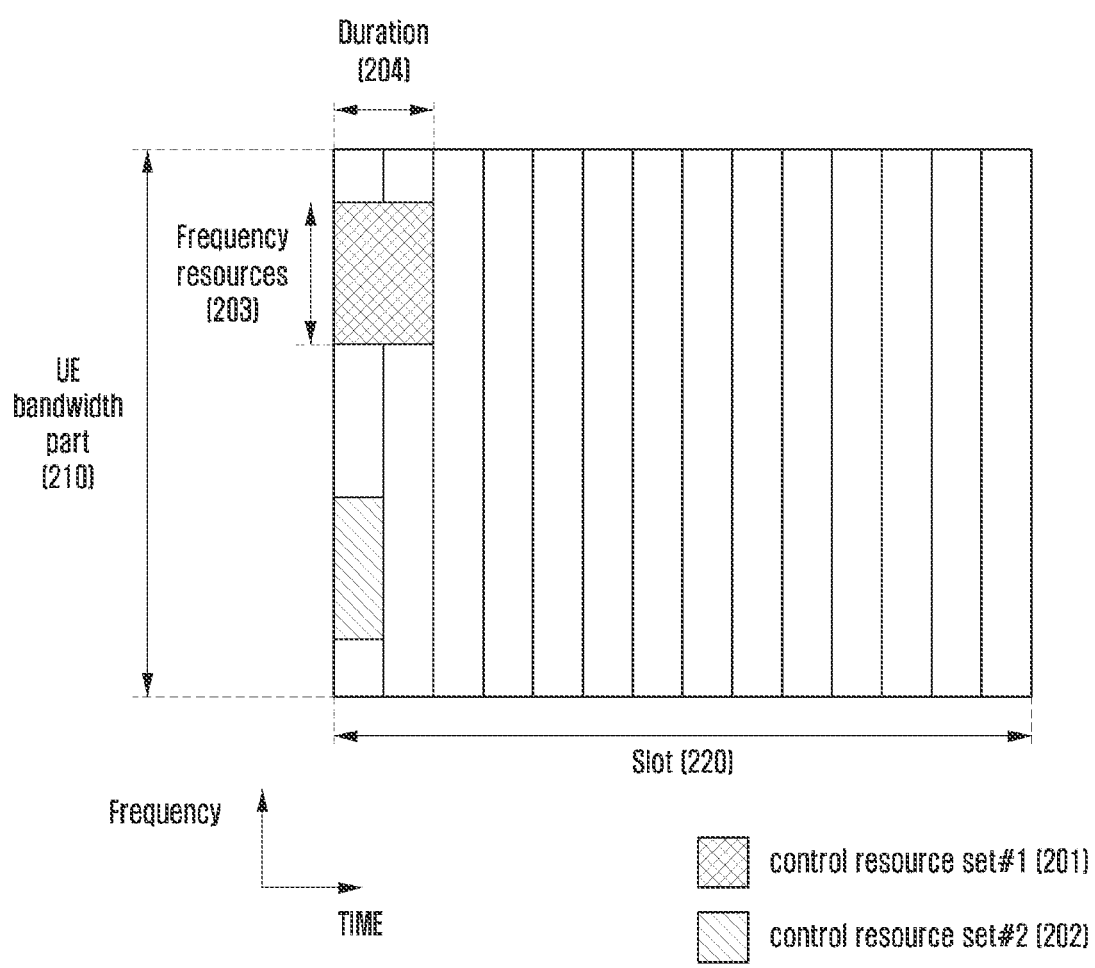
FIG. 2B is a diagram illustrating an example of a control resource set (CORESET) on which a downlink control channel is transmitted in a 5G wireless communication system according to an embodiment of the disclosure.

FIG. 2B is a diagram illustrating an example of a control resource set on which a downlink control channel is transmitted in a 5G wireless communication system according to an embodiment of the disclosure.

With reference to FIG. 2B, an example is illustrated, in which a UE bandwidth part 210 is configured on a frequency axis, and two control resource sets (control resource set #1 201 and control resource set #2 202) are configured in one slot 220 on a time axis. The control resource sets 201 and 202 may be configured for a specific frequency resource 203 in the entire UE bandwidth part 210 on the frequency axis. On the time axis, one or a plurality of OFDM symbols may be configured, and this may be defined as a control resource set duration 204. With reference to the example illustrated in FIG. 2, the control resource set #1 201 may be configured as the control resource set duration of two symbols, and the control resource set #2 202 may be configured as the control resource set duration of one symbol.

The control resource set in the above-described 5G may be configured from the base station to the UE through upper layer signaling (e.g., system information, MIB, and RRC signaling). Configuration of the control resource set for the UE means providing of information, such as control resource set identity, frequency location of the control resource set, and symbol duration of the control resource set. For example, the upper layer signaling may include information in Table 11 below.

TABLE 11

```
ControlResourceSet ::=              SEQUENCE {
Corresponds to L1 parameter 'CORESET-ID'
controlResourceSetId                ControlResourceSetId,
frequencyDomainResources              BIT STRING (SIZE (45)),
duration                            INTEGER (1 . . . maxCoReSetDuration),
cce-REG-MappingType                    CHOICE {
interleaved                         SEQUENCE {
reg-BundleSize                      ENUMERATED {n2, n3, n6},
precoderGranularity                   ENUMERATED {sameAsREG-bundle,
allContiguousRBs},
interleaverSize                     ENUMERATED {n2, n3, n6}
shiftIndex                          INTEGER(0 . . . maxNrofPhysicalResourceBlocks−
                                    1)
                                    OPTIONAL
},
nonInterleaved                         NULL
},
tci-StatesPDCCH                        SEQUENCE(SIZE (1..maxNrofTCI-
StatesPDCCH)) OF TCI-StateId           OPTIONAL,
tci-PresentInDCI                    ENUMERATED {enabled}
                                    OPTIONAL, -- Need S
}
```

In Table 11, tci-StatesPDCCH (simply named transmission configuration indication (TCI) state) configuration information may include information of one or a plurality of SS/PBCH block indexes or channel state information reference signal (CSI-RS) indexes being in QCL relationship with a DMRS that is transmitted in the corresponding control resource set.

As an example, respective control information included in DCI format 1_1 that is scheduling control information (DL grant) for the downlink data may be as follows.

Carrier indicator: This indicates on which carrier data being scheduled by DCI is transmitted (0 or 3 bits).

Identifier for DCI formats: This indicates a DCI format, and specifically, this is an indicator discriminating whether the corresponding DCI is for the downlink or the uplink ([1] bits).

Bandwidth part indicator: If a bandwidth part is changed, this indicates such a change (0, 1 or 2 bits).

Frequency domain resource assignment: This is resource allocation information indicating frequency domain resource allocation, and resources being expressed differently depending on whether the resource allocation type is 0 or 1.

Time domain resource assignment: This is resource allocation information indicating time domain resource allocation, and may indicate one configuration of upper layer signaling or predetermined PDSCH time domain resource allocation list (1, 2, 3, or 4 bits).

VRB-to-PRB mapping: This indicates the mapping relationship between a virtual resource block (VRB) and a physical resource block (PRB) (0 or 1 bit).

PRB bundling size indicator: This indicates the bundling size of physical resource blocks being assumed that the same precoding is applied thereto (0 or 1 bit).

Rate matching indicator: This indicates which rate matching group among configured rate matching groups is applied to an upper layer that is applied to a PDSCH (0, 1, or 2 bits).

ZP CSI-RS trigger: This triggers a zero-power channel state information reference signal (0, 1, or 2 bits).

Transport block (TB) related configuration information: This indicates a modulation and coding scheme (MCS), a new data indicator (NDI), and a redundancy version (RV) for one or two TBs.

Modulation and coding scheme (MCS): This indicates a modulation method and a coding rate used for data transmission. That is, it may indicate a coding rate value capable of notifying of TBS and channel coding information together with information on whether the modulation is QPSK, 16QAM, 64QAM, or 256QAM.

New data indicator: This indicates whether the transmission is an HARQ initial transmission or retransmission.

Redundancy version: This indicates an HARQ redundancy version.

HARQ process number: This indicates an HARQ process number applied to PDSCH (4 bits)

Downlink assignment index: This is an index for generating dynamic HARQ-ACK codebook during HARQ-ACK report for PDSCH (0 or 2 or 4 bits).

TPC command for scheduled PUCCH: Power control information applied to PUCCH for HARQ-ACK report for PDSCH (2 bits)

PUCCH resource indicator: Information indicating a PUCCH resource for HARQ-ACK report for PDSCH (3 bits)

PDSCH-to-HARQ_feedback timing indicator: configuration information on which slot the PUCCH for the HARQ-ACK report for the PDSCH is transmitted from (3 bits).

Antenna ports: Information indicating an antenna port of PDSCH DMRS and a DMRS CDM group from which the PDSCH is not transmitted (4, 5, or 6 bits)

Transmission configuration indication: Information indicating beam related information of the PDSCH (0 or 3 bits)

SRS request: Information for requesting SRS transmission (2 bits)

CBG transmission information: In case that retransmission based on a code block group is configured, information indicating to which code block group (CBG) the corresponding data is transmitted through the PDSCH (0, 2, 4, 6, or 8 bits)

CBG flushing out information: Information indicating whether a code block group previously received by a UE is able to be used for HARQ combining (0 or 1 bit)

DMRS sequence initialization: This indicates a DMRS sequence initialization parameter (1 bit).

As described above, in case of the data transmission on the PDSCH or PUSCH, a time domain resource assignment may be transferred by information on a slot in which the PDSCH/PUSCH is transmitted and a start symbol location S in the corresponding slot and the number L of symbols onto which the PDSCH/PUSCH is mapped. In this case, S may be a relative location from the start of the slot, L may be the number of successive symbols, and S and L may be determined from start and length indicator value (SLIV) defined as in Mathematical expression 1 below.

[Mathematical expression 1]

if $(L-1) \le 7$ then $SLIV = 14 \cdot (L-1) + S$ else $SLIV = 14 \cdot (14 - L + 1) + (14 - 1 - S)$ where $0 < L \le 14 - S$ In the NR system, the UE may be configured with information on an SLIV value, a PDSCH/PUSCH mapping type, and a slot in which the PUSCH/PUSCH is transmitted in one row through an RRC configuration (e.g., the above information may be configured in the form of a table). Thereafter, in the DCI time domain resource allocation, an index value in the configured table is indicated, and thus the base station may transfer, to the UE, information on the SLIV value, the PDSCH/PUSCH mapping type, and the slot in which the PDSCH/PUSCH is transmitted. In the NR system, as PDSCH mapping types, type A and type B are defined. In the PDSCH mapping type A, a first symbol among DMRS symbols is located in the second or third OFDM symbol of the slot. In the PDSCH mapping type B, a first symbol among DMRS symbols is located in the first OFDM symbol in a time domain resource allocated through PUSCH transmission. Downlink data may be transmitted on the PDSCH that is a physical channel for transmitting downlink data. The PDSCH may be transmitted after the control channel transmission interval, and scheduling information, such as a detailed mapping location and a modulation method, in the frequency domain is determined based on the DCI being transmitted through the PDCCH. Through the MCS among control information constituting the DCI, the base station notifies the UE of the modulation method applied to the PDSCH intended to be transmitted and the size of data (transport block size (TBS)). In an embodiment, the MCS may be composed of 5 bits or more or less. The TBS corresponds to the size before the channel coding for error correction is applied to the transport block (TB).

In the disclosure, the transport block (TB) may include a medium access control (MAC) header, a MAC control element, and one or more MAC service data units (SDUs). Further, the TB may indicate the unit of data delivered from a MAC layer to a physical layer or a MAC protocol data unit (PDU).

Modulation methods supported in the NR system are quadrature phase shift keying (QPSK), 16 quadrature amplitude modulation (QAM), 64QAM, and 256QAM, and each modulation order (Qm) corresponds to 2, 4, 6, or 8. That is, in case of the QPSK modulation, 2 bits may be transmitted for each symbol, and in case of the 16QAM modulation, 4 bits may be transmitted for each symbol. In case of the 64QAM modulation, 6 bits may be transmitted for each symbol, and in case of the 256QAM modulation, 8 bits may be transmitted for each symbol.

Figure 3:
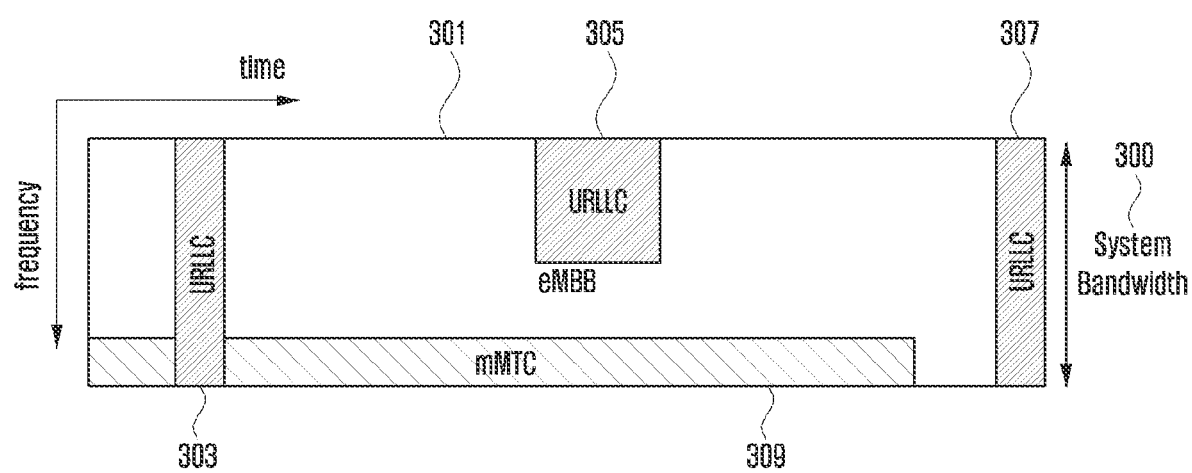
FIG. 3 is a diagram illustrating an example in which eMBB, URLLC, and mMTC data are allocated to the entire system frequency band.
Figure 4:
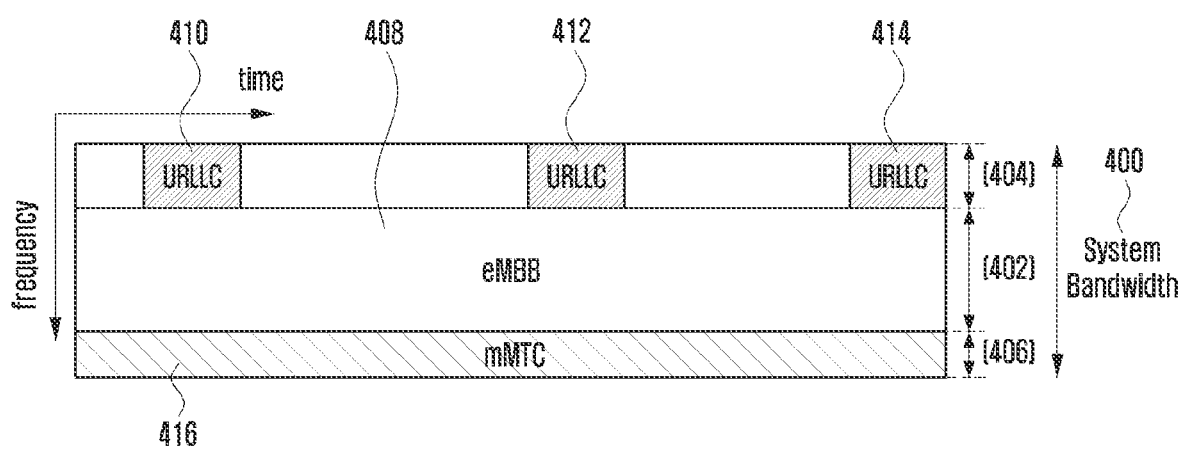
FIG. 4 is a diagram illustrating an example in which eMBB, URLLC, and mMTC data are allocated to divided system frequency bands.

FIGS. 3 and 4 are diagrams illustrating an example in which eMBB, URLLC, and mMTC data, which are services considered in a 5G or NR system, are allocated on the frequency-time resources. With reference to FIGS. 3 and 4, methods in which frequency and time resources are allocated to each system for information transmission may be identified.

FIG. 3 is a diagram illustrating an example in which eMBB, URLLC, and mMTC data are allocated to the entire system frequency band. First, FIG. 3 shows that the eMBB, URLLC, and mMTC data are allocated in the entire system frequency band 300. In case that URLLC data 303, 305, and 307 are generated and are required to be transmitted while the eMBB 301 and the mMTC 309 are allocated and transmitted in a specific frequency band, the URLLC data 303, 305, and 307 may be transmitted without emptying a part to which the eMBB 301 and the mMTC 309 have already been allocated or without transmitting the eMBB 301 and the mMTC 309. Because it is necessary to reduce the latency of the URLLC among the services, the URLLC data may be allocated (303, 305, and 307) to a part of the allocated resource 301, and then may be transmitted. Of course, if the URLLC is additionally allocated to the resource to which the eMBB has been allocated, and is transmitted, the eMBB data may not be transmitted in the duplicate frequency-time resource, and thus the transmission performance of the eMBB data may be degraded. That is, in the above-described case, transmission failure of the eMBB data may occur due to the URLLC allocation.

FIG. 4 is a diagram illustrating an example in which eMBB, URLLC, and mMTC data are allocated to divided system frequency bands. In FIG. 4, the entire system frequency bandwidth 400 may be divided into subbands 402, 404, and 406 to be used for the purpose of transmitting services and data. Information related to the subband configuration may be predetermined, and this information may be transmitted from the base station to the UE through upper signaling. Further, the subbands may be optionally divided by the base station or a network node, and may provide the services to the UE without transmitting separate subband configuration information. FIG. 4 illustrates that subband 402 is used for eMBB data transmission, subband 404 is used for URLLC data transmission, and subband 406 is used for mMTC data transmission.

In order to explain a method and an apparatus proposed in an embodiment, terms "physical channel" and "signal" may be used in the NR system. However, the contents of the disclosure will be able to be applied to a wireless communication system that is not the NR system.

Hereinafter, embodiments of the disclosure will be described in detail with reference to the accompanying drawings. Further, in describing the disclosure, the detailed explanation of related functions or configurations will be omitted if it is deemed to make the subject matter of the disclosure unnecessarily vague. Furthermore, terms to be described hereinafter have been defined by taking into consideration functions thereof in the disclosure, and may differ depending on a user, an operator's intention, or customs. Accordingly, each term should be defined based on contents over the entire specification.

In the disclosure, a downlink (DL) is a radio transmission path of a signal that the base station transmits to the UE, and an uplink (UL) means a radio transmission path that the UE transmits to the base station.

Hereinafter, although an embodiment of the disclosure will be described taking the NR system as an example, the embodiment of the disclosure may also be applicable to other communication systems having similar technical backgrounds or channel types. Further, the embodiment of the disclosure may also be applied to other communication systems through partial modifications in a range that does not greatly deviate from the scope of the disclosure by the judgment of those skilled in the art.

In the disclosure, the terms "physical channel" and "signal" in the related art may be interchangeably used with "data" or "control signal". For example, although PDSCH is a physical channel on which data is transmitted, the PDSCH may be called data in the disclosure.

Hereinafter, in the disclosure, upper signaling is a method for transferring a signal from the base station to the UE by using a downlink data channel of a physical layer, or from the UE to the base station by using an uplink data channel of a physical layer, and may be mentioned RRC signaling or MAC control element (MAC CE).

Figure 5:
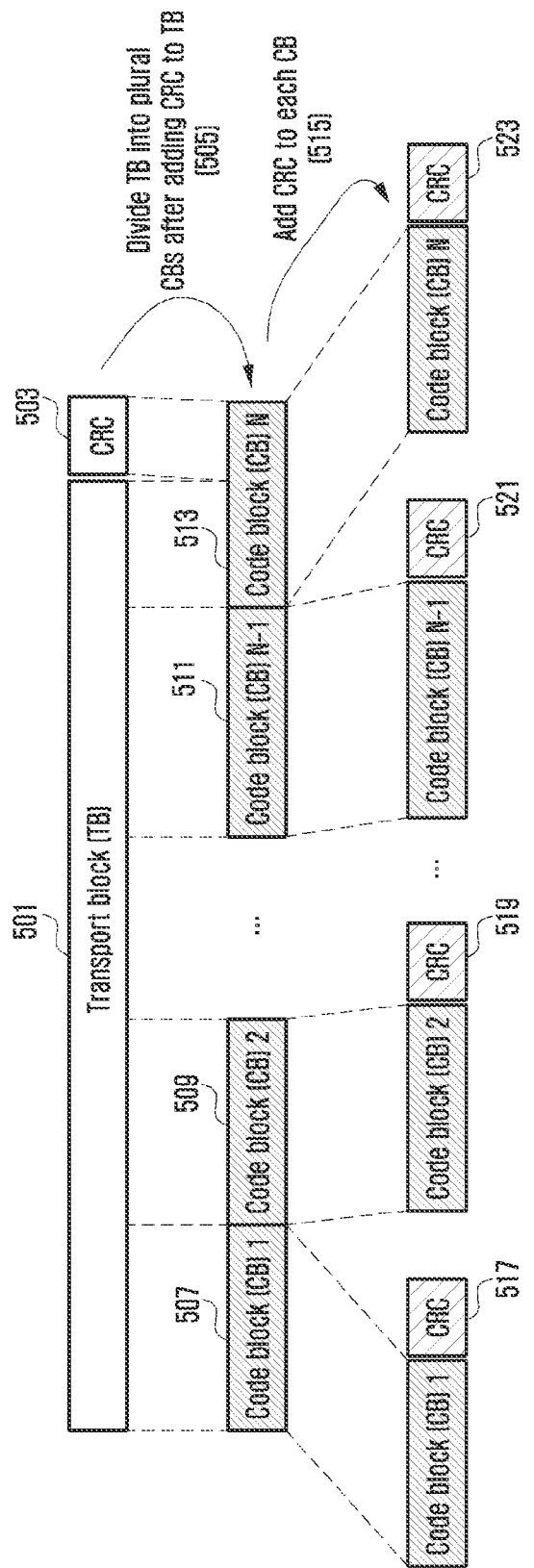
FIG. 5 is a diagram illustrating an example of a process in which one transport block is divided into several code blocks, and CRCs are added thereto.

FIG. 5 is a diagram illustrating an example of a process in which one transport block is divided into several code blocks, and CRCs are added thereto.

With reference to FIG. 5, a CRC 503 may be added to the last or head part of one transport block (TB) 501 intended to be transmitted on an uplink or a downlink. The CRC 503 may be composed of 16 bits, 25 bits, or a prefixed bit number, or may be composed of a variable bit number in accordance with channel situations, and may be used to determine whether channel coding has succeeded. A block including the TB 501 and the CRC 503 added thereto may be divided into several code blocks (CBs) 507, 509, 511, and 513 (505). Here, the code blocks may have predetermined maximum sizes, and in this case, the last code block 513 may have a size that is smaller than the size of other code blocks 507, 509, and 511. However, this is merely exemplary, and according to another example, the last code block 513 may be set to have the same length as the length of other code blocks 507, 509, and 511 through insertion of 0, a random value, or 1 into the last code block 513.

Further, CRCs 517, 519, 521, and 523 may be respectively added to the code blocks 507, 509, 511, and 513 (515). The CRC may be composed of 16 bits, 24 bits, or a prefixed bit number, and may be used to determine whether the channel coding has succeeded.

In order to generate the CRC 503, the TB 501 and a cyclic generator polynomial may be used, and the cyclic generator polynomial may be defined in various methods. For example, if it is assumed that a cyclic generator polynomial for the CRC of 24 bits is gCRC24A(D)=D24+D23+D18+D17+D14+D11+D10+D7+D6+D5+D4+D3+D+1, and L is 24, with respect to TB data $a_0, a_1, a_2, a_3, \ldots, a_{A-1}$, the CRC $p_0, p_1, p_2, p_3, \ldots, p_{L-1}$ may be determined as a value obtained by dividing $a_0D^{A+23}+a_1D^{A+22}+ \ldots +a_{A-1}D^{24}+p_0D^{23}+p_1D^{22}+ \ldots +p_{22}D^1+p_{23}$ by gCRC24A(D) with a remainder of 0. In the above-described example, although it is assumed that the CRC length L is 24, the CRC length L may be determined to include various lengths, such as 12, 16, 24, 32, 40, 48, 64, and the like.

After the CRC is added to the TB in the above-described process, the TB+CRC may be divided into N CBs 507, 509, 511, and 513. CRCs 517, 519, 521, and 523 may be added to the divided CBs 507, 509, 511, and 513, respectively (515). The CRC added to the CB may have a length that is different from the length of the CRC added to the TB, or another cyclic generator polynomial may be used to generate the CRC. Further, the CRC 503 added to the TB and the CRCs 517, 519, 521, and 523 added to the code blocks may be omitted depending on the kind of a channel code to be applied to the code blocks. For example, if an LDPC code, rather than a turbo code, is to be applied to the code blocks, the CRCs 517, 519, 521, and 523 to be inserted into the code blocks may be omitted.

However, even in case that the LDPC is applied, the CRCs 517, 519, 521, and 523 may be added to the code blocks as they are. Further, even in case that a polar code is used, the CRCs may be added or omitted.

As described above with reference to FIG. 5, in the TB intended to be transmitted, the maximum length of one code block may be determined in accordance with the kind of the applied channel coding, and in accordance with the maximum length of the code block, division of the TB and the CRC added to the TB into the code blocks may be performed.

In an LTE system in the related art, a CRC for a CB is added to a divided CB, and data bits of the CB and the CRC are encoded with a channel code to determine coded bits, and as pre-engaged with respect to the coded bits, the number of the rate-matched bits is determined.

In the NR system, the TB size (TBS) may be calculated through the following operations.

Operation 1: In one PRB within an allocated resource, $N'_{RE}$ that is the number of REs allocated to PDSCH mapping in one PRB in an allocated resource is calculated.

Here, $N'_{RE}$ may be calculated by $N_{sc}^{RB} \cdot N_{symb}^{sh} - N_{DMRS}^{PRB} - N_{oh}^{RB}$. Here, $N_{sc}^{RB}$ is 12, and $N_{symb}^{sh}$ may indicate the number of OFDM symbols allocated to the PDSCH. $N_{DMRS}^{PRB}$ is the number of REs in one PRB occupied by a DMRS of the same CDM group. $N_{oh}^{PRB}$ is the number of REs occupied by an overhead in one PRB configured through upper signaling, and may be configured to one of 0, 6, 12, and 18. Thereafter, the total number $N_{RE}$ of REs allocated to the PDSCH may be calculated. Here, $N_{RE}$ is calculated by min(156, $N'_{RE}$)·$n_{PRB}$, and $n_{PRB}$ indicates the number of PRBs allocated to the UE.

Operation 2: The number $N_{info}$ of temporary information bits may be calculated as $N_{RE}*R*Q_m*v$. Here, R is a code rate, $Q_m$ is a modulation order, and information of these values may be transferred using a table pre-engaged with an MCS bit field in control information. Further, v is the number of allocated layers. If $N_{info} \leq 3824$, a TBS may be calculated through operation 3 below. Otherwise, the TBS may be calculated through operation 4.

Operation 3: $N'_{info}$ may be calculated through formulas $$N'_{info} = \max\left(24, 2^n * \left\lfloor \frac{N_{info}}{2^n} \right\rfloor\right)$$

and $n=\max(3, \lfloor \log_2(N_{info}) \rfloor -6)$. The TBS may be determined as a value that is closest to $N'_{info}$ among values that are not smaller than $N_{info}$ in Table 12 below.

TABLE 12

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 356 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 4: $N'_{info}$ may be calculated through formulas of $$N'_{info} = \max\left(3840, 2^n \times \text{round}\left(\frac{N_{info} - 24}{2^n}\right)\right)$$

and $n = \lfloor \log_2 (N_{info} - 24) \rfloor -5$. The TBS may be determined through the $N'_{info}$ value and [pseudo-code 1] below. Hereunder, C corresponds to the number of code blocks included in one TB.

[Pseudo-code 1 Start]
if $R \leq 1/4$ $$TBS = 8 * C * \left\lceil \frac{N'_{info} + 24}{8 * C} \right\rceil - 24, \text{ where } C = \left\lceil \frac{N'_{info} + 24}{3816} \right\rceil$$

else
  if $N_{info}' > 8424$ $$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if
end if
[Pseudo-code 1 End]

In the NR system, if one CB is inputted to an LDPC encoder, parity bits may be added to the CB to be outputted. In this case, the quantity of parity bits may differ in accordance with an LDCP base graph. A method for sending all parity bits generated by LDPC coding with respect to a specific input may be called full buffer rate matching (FBRM), and a method for limiting the number of transmittable parity bits may be called limited buffer rate matching (LBRM). If resources are allocated for data transmission, an LDPC encoder output is made by a circular buffer, and bits of the made buffer are repeatedly transmitted to the extent of the allocated resources. In this case, the length of the circular buffer may be $N_{cb}$.

If the number of all parity bits being generated by the LDPC coding is N, the length $N_{cb}$ of the circular buffer becomes N in an FBRM method. In an LBRM method, $N_{cb}$ becomes min(N,$N_{ref}$), $N_{ref}$ is given as $$\left\lfloor \frac{TBS_{LBRM}}{C \cdot R_{LBRM}} \right\rfloor,$$

and $R_{LBRM}$ may be determined as ⅔. In order to obtain $TBS_{LBRM}$, the above-described method for obtaining the TBS is used, and the maximum number of layers and the maximum modulation order supported by and configured to the UE in the corresponding cell may be assumed. Further, it is assumed that the maximum modulation order Qm is 8 if it is configured to use an MCS table supporting 256QAM for at least one BWP, whereas the maximum modulation order Qm is 6 (64QAM) if not, and the code rate is 948/1024 that is the maximum code rate. Further, it is assumed that $N_{RE}$ is 156·$n_{PRB}$, and $n_{PRB}$ is $n_{PRB,LBRM}$ to be calculated. Here, $n_{PRB,LBRM}$ may be given as in Table 13 below.

TABLE 13

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system, the maximum data rate supported by the UE may be determined through Mathematical expression 2 below.

[Mathematical expression 2]

data rate (in Mbps) =

$$10^{-6} \cdot \sum_{j=1}^{J}\left(v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot \left(1 - OH^{(j)}\right)\right)$$

In the mathematical expression 2, it may mean that J is the number of carriers tied through carrier aggregation, $R_{max}$=948/1024, $v_{Layers}^{(j)}$ is the maximum number of layers, $Q_m^{(j)}$ is the maximum modulation order, $f^{(j)}$ is a scaling index, and y is a subcarrier spacing. Here, $f^{(j)}$ is one value of 1, 0.8, 0.75, and 0.4, which may be reported by the UE, and μ may be given as in Table 14 below.

TABLE 14

| μ | Δf = $2^\mu$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Further, $T_s^\mu$ is an average OFDM symbol length, $T_s^\mu$ may be calculated as $$\frac{10^{-3}}{14 \cdot 2^\mu},$$

and $N_{PRB}^{BW(j),\mu}$ is the maximum number of RBs in BW(j). Further, $OH^{(j)}$ is an overhead value, which may be given as 0.14 in a downlink of FR1 (not higher than 6 GHz band) and may be given as 0.18 in an uplink, and which may be given as 0.08 in a downlink of FR2 (exceeding 6 GHz band) and may be given as 0.10 in an uplink. The maximum data rate in the downlink in the cell having 100 MHz frequency bandwidth at 30 kHz subcarrier spacing through the Mathematical expression 2 may be calculated as in Table 15 below.

TABLE 15

| $f^{(j)}$ | $v_{Layers}^{(j)}$ | $Q_m^{(j)}$ | $R_{max}$ | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

In contrast, the actual data rate that can be measured by the UE in the actual data transmission may be a value obtained by dividing the data amount by the data transmission time. This may be TBS in 1 TB transmission, and may be a value obtained by dividing the sum of TBSs by the TTI length in 2 TB transmission. As an example, in the same manner as the assumption to obtain Table 15 above, the actual maximum data rate in the downlink in the cell having the 100 MHz frequency bandwidth at the 30 kHz subcarrier spacing may be determined as in Table 16 below in accordance with the number of allocated PDSCH symbols.

TABLE 16

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

Through Table 15, it is possible to identify the maximum data rate supported by the UE, and through Table 16, it is possible to identify the actual data rate following the allocated TBS. In this case, the actual data rate may be higher than the maximum data rate in accordance with the scheduling information.

In a wireless communication system, and particularly, in a new radio (NR) system, the data rate that can be supported by the UE may be engaged between the base station and the UE. This may be calculated using the maximum frequency band supported by the UE, the maximum modulation order, and the maximum number of layers. However, the calculated data rate may be different from the value calculated from the transport block size (TBS) used for the actual data transmission and the length of the transmission time interval (TTI).

Accordingly, the UE may be allocated with the TBS that is larger than the value corresponding to the data rate supported by the UE itself, and in order to prevent this, there may be limitations in schedulable TBS in accordance with the data rate supported by the UE.

Figure 6:
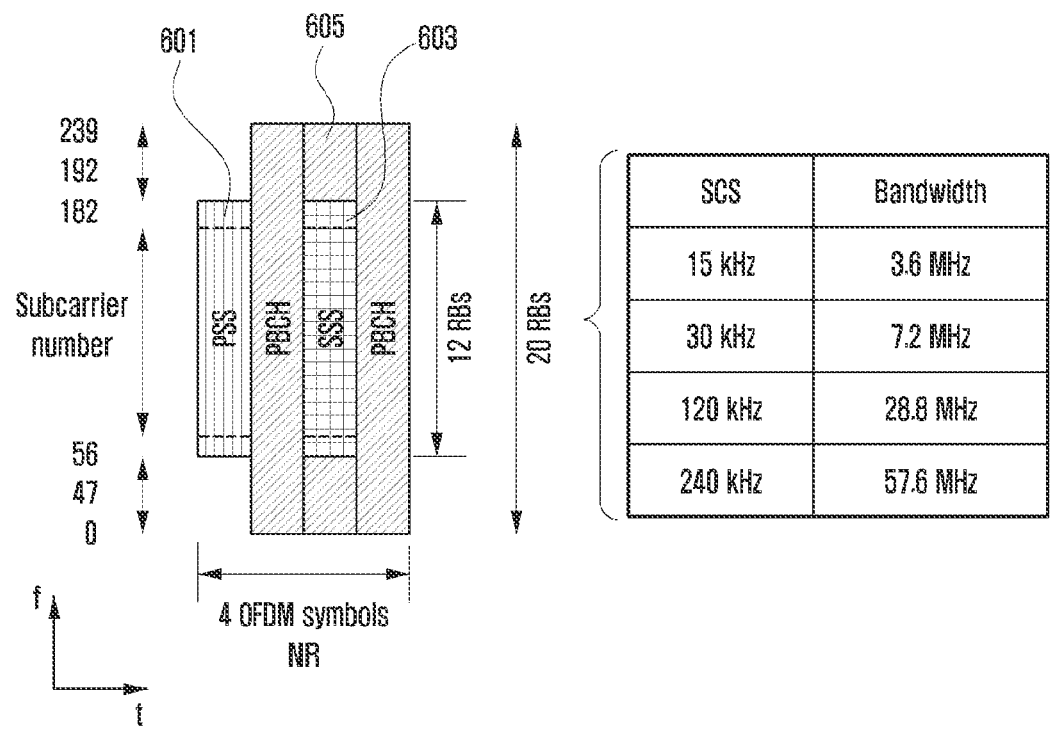
FIG. 6 is a diagram illustrating a state in which a synchronization signal (SS) and a physical broadcasting channel (PBCH) in an NR system are mapped onto each other in frequency and time domains.

FIG. 6 is a diagram illustrating a state in which a synchronization signal (SS) and a physical broadcasting channel (PBCH) in an NR system are mapped onto each other in frequency and time domains.

A primary synchronization signal (PSS) 601, a secondary synchronization signal (SSS) 603, and a PBCH are mapped onto each other over 4 OFDM symbols, the PSS and the SSS are mapped onto 12 RBs, and the PBCH is mapped onto 20 RBs. It is illustrated in a table of FIG. 7 how the frequency bands of 20 RBs are changed in accordance with a subcarrier spacing (SCS). A resource region on which the PSS, SSS, and PBCH are transmitted may be called an SS/PBCH block. Further, the SS/PBCH block may be called an SSB block.

Figure 7:
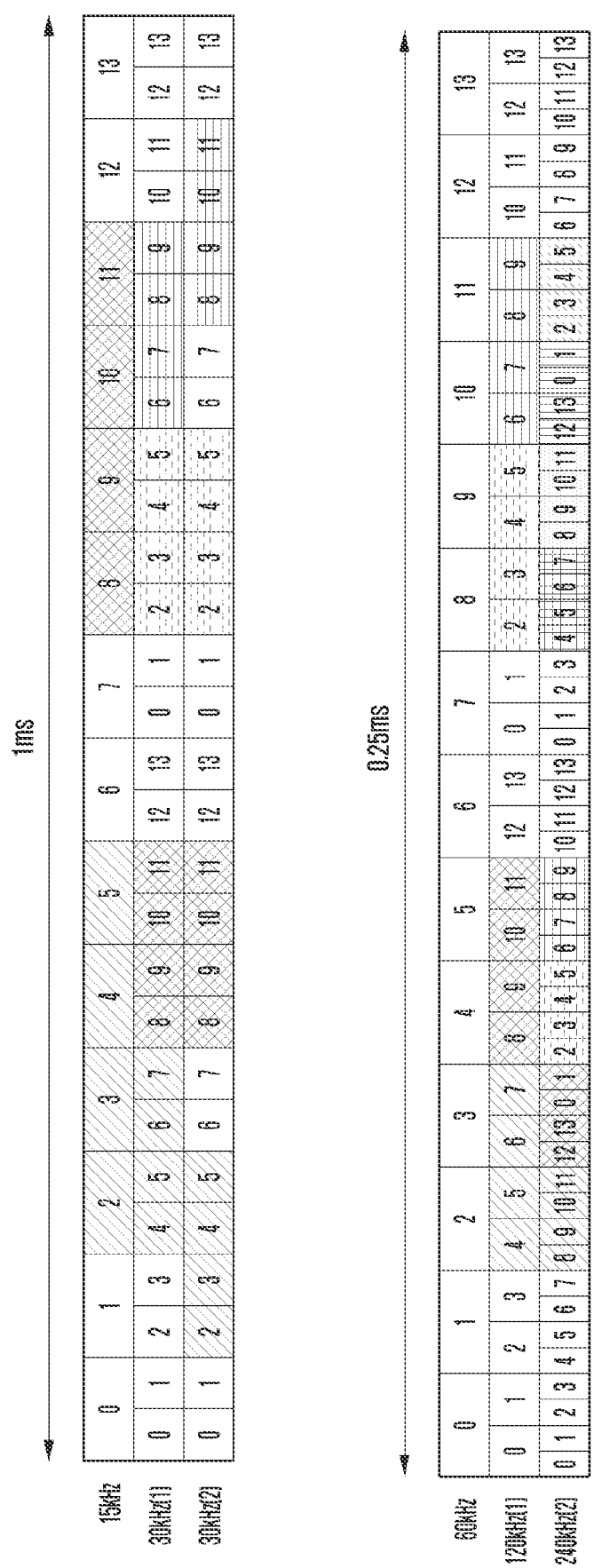
FIG. 7 is a diagram illustrating a symbol in which SS/PBCH blocks can be transmitted in accordance with subcarrier spacing.

FIG. 7 is a diagram illustrating a symbol in which SS/PBCH blocks can be transmitted in accordance with subcarrier spacing.

With reference to FIG. 7, the subcarrier spacing may be configured as 15 kHz, 30 kHz, 120 kHz, and 240 kHz, and in accordance with the subcarrier spacing, the location of a symbol in which an SS/PBCH block (or SSB block) can be located may be determined. FIG. 7 illustrates the symbol location in which the SSB in accordance with the subcarrier spacing can be transmitted on each symbol within 1 ms, but it is not necessary that the SSB is always transmitted in the region indicated in FIG. 7. Accordingly, the location in which the SSB block is transmitted may be configured in the UE through system information or dedicated signaling.

In general, since the UE is far apart from the base station, a signal transmitted from the UE is received in the base station after a propagation delay. The propagation delay is a value obtained by dividing a path in which radio waves are transferred from the UE to the base station by the speed of light, and in general, it may be a value obtained by dividing the distance between the UE and the base station by the speed of light. In an embodiment, in case of the UE that is located 100 km apart from the base station, the signal transmitted from the UE is received in the base station after about 0.34 msec. In contrast, a signal transmitted from the base station is received in the UE after about 0.34 msec. As described above, depending on the distance between the UE and the base station, the time when the signal transmitted from the UE arrives at the base station may differ. Accordingly, in case that several UEs existing in different locations transmit signals at the same time, the time when each signal arrives at the base station may differ. In order to solve this problem and to make signals transmitted from several UEs arrive at the base station at the same time, the time when an uplink signal is transmitted in accordance with the location for each UE may differ. In the 5G, NR, and LTE systems, this is called timing advance.

Figure 8:
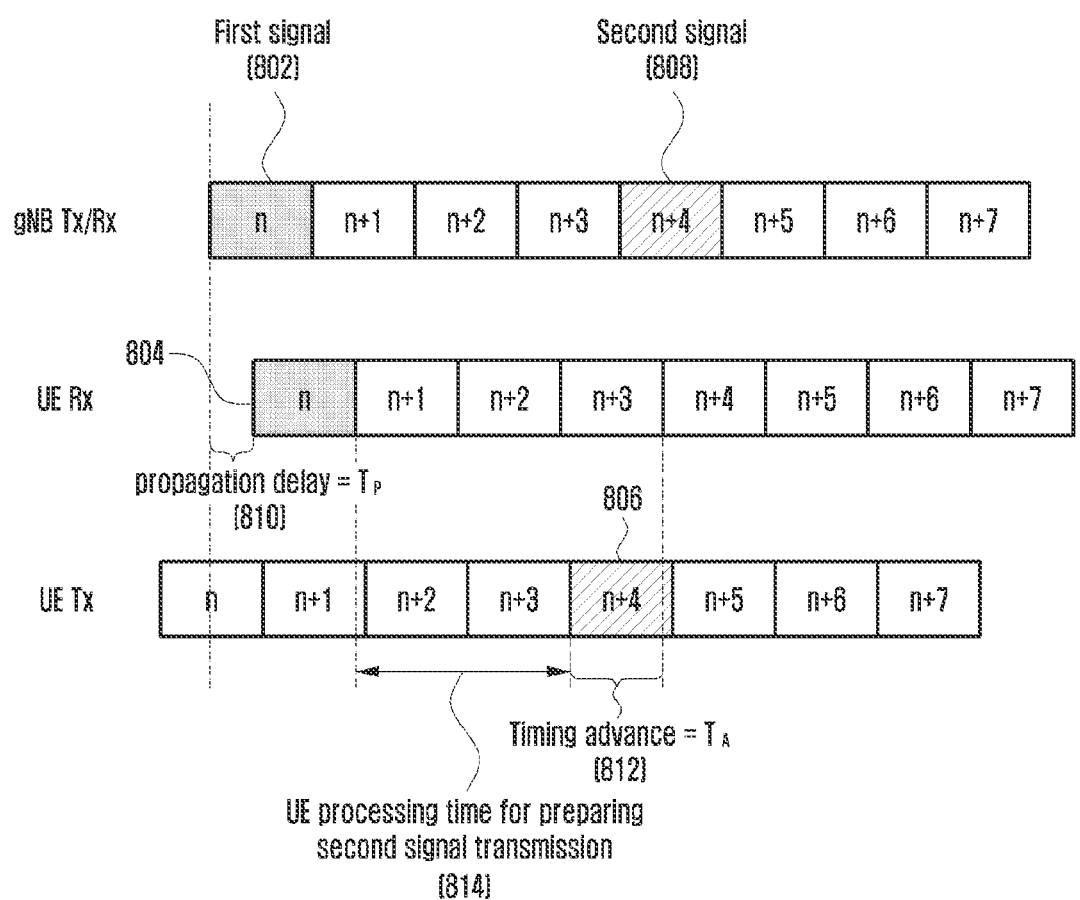
FIG. 8 is a diagram illustrating a processing time of a UE in accordance with a timing advance when the UE receives a first signal and transmits a second signal about the first signal in a 5G or NR system according to a disclosed embodiment.

FIG. 8 is a diagram illustrating a processing time of a UE in accordance with a timing advance when the UE receives a first signal and transmits a second signal about the first signal in a 5G or NR system according to a disclosed embodiment.

Hereinafter, the processing time of the UE in accordance with the timing advance will be described in detail. If the base station transmits, to the UE, uplink scheduling grant (UL grant) or a downlink control signal and data (DL grant and DL data) in slot n 802, the UE may receive the uplink scheduling grant or the downlink control signal and the data at slot n 804. In this case, the UE may receive the signal as late as the propagation delay (Tp) 810 in comparison to the time when the base station transmits the signal. In an embodiment, if the UE receives the first signal in slot n 804, the UE transmits the second signal in slot n+4 806. Even when the UE transmits the signal to the base station, in order for the signal to arrive at the base station at a specific time, the UE may transmit an HARQ ACK/NACK for uplink data or downlink data in the timing 806 as early as the timing advance (TA) 812 in comparison to the slot n+4 based on the signal received by the UE. Accordingly, in the embodiment, the time in which the UE can prepare to transfer the HARQ ACK or NACK after transmitting the uplink data or receiving the downlink data through reception of the uplink scheduling grant may be the time obtained by excluding the TA from the time corresponding to three slots (814).

In order to determine the above-described timing, the base station may calculate an absolute value of the TA of the corresponding UE. At an initial access of the UE, the base station may calculate the absolute value of the TA by adding or subtracting the variation of the TA value transferred through the subsequent upper signaling to or from the TA value firstly transferred to the UE at a random access stage. In the disclosure, the absolute value of the TA may be the value obtained by subtracting a start time of the n-th TTI received by the UE from a start time of the n-th TTI transmitted by the UE.

Meanwhile, one of important criteria of the performance of a cellular radio communication system is packet data latency. For this, in the LTE system, signal transmission/reception is performed in the unit of a subframe having a transmission time interval (hereinafter, TTI) of 1 ms. In the LTE system operating as described above, a UE having the transmission time interval shorter than 1 ms (short-TTI UE) can be supported. Meanwhile, in the 5G or NR system, the transmission time interval may be shorter than 1 ms. The short-TTI UE is suitable for a voice over LTE (VoLTE) service or a remote control service in which the latency is important. Further, the short-TTI UE may be a means for realizing cellular-based mission-critical internet of things (IoT).

In the 5G or NR system, when the base station transmits the PSDCH including the downlink data, DCI for scheduling the PDSCH indicates a K1 value that is a value corresponding to timing information for the UE to transmit the HARQ-ACK information for the PDSCH. In case that it is not indicated to transmit the HARQ-ACK information including the timing advance earlier than symbol L1, the UE may transmit the HARQ-ACK to the base station. That is, at the time when or after the HARQ-ACK information including the timing advance becomes equal to the symbol L1, the HARQ-ACK information may be transmitted from the UE to the base station. In case that the HARQ-ACK information includes the timing advance and is indicated to be transmitted earlier than the symbol L1, the HARQ-ACK information may not be effective HARQ-ACK information during the HARQ-ACK transmission from the UE to the base station.

Symbol L1 may be the first symbol in which a cyclic prefix (CP) starts after $T_{proc,1}$ from the last time of the PDSCH. The $T_{proc,1}$ may be calculated as in Mathematical expression 3 below.

$$T_{proc,1} = ((N_1 + d_{1,1} + d_{1,2})(2048 + 144) \cdot \kappa \cdot 2^{-\mu}) \cdot T_c \qquad \text{[Mathematical expression 3]}$$

In Mathematical expression 3 as described above, N1, d1,1, d1,2, κ, μ, and TC may be defined as follows.

If the HARQ-ACK information is transmitted to the uplink control channel (PUCCH), d1,1 becomes d1,1=0, whereas if the uplink shared channel (PUSCH) (data channel) is transmitted, d1,1 becomes d1,1=1.

In case that the UE is configured with a plurality of activated configuration carriers or carriers, the maximum timing difference between carriers may be reflected in the second signal transmission.

In case of PDSCH mapping type A, that is, if the first DMRS symbol location is the third or fourth symbol of a slot, d1,2 is defined as d1,2=7−I in case that a location index i of the last symbol of the PDSCH is smaller than 7.

In case of PDSCH mapping type B, that is, if the first DMRS symbol location is the first symbol of the PDSCH, d1,2 becomes d1,2=3 in case that the length of the PDSCH is 4 symbols, and d1,2 becomes d1,2=3+d in case that the length of the PDSCH is 2 symbols. In this case, d is the number of symbols in which the PDSCH and the PDCCH including a control signal for scheduling the corresponding PDSCH overlap each other.

N1 is defined as in Table 17 below in accordance with μ. μ=0, 1, 2, and 3 mean respective subcarrier spacings 15 kHz, 30 kHz, 60 kHz, and 120 kHz.

TABLE 17

| | PDSCH decoding time $N_1$ [symbols] | |
|---|---|---|
| μ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

Different N1 values provided in the above-described Table 17 may be used depending on UE capability.

It is Defined that $$T_c = 1/(\Delta f_{max} \cdot N_f), \Delta f_{max} = 480 \cdot 10^3 Hz, N_f = 4096, \kappa = T_s/T_c = 64, T_s = 1/(\Delta f_{ref} \cdot N_{f,ref}) \Delta f_{ref} = 15 \cdot 10^3 Hz, N_{f,ref} = 2048$$

Further, in the 5G or NR system, in case that the base station transmits control information including uplink scheduling grant, the UE may indicate the K2 value corresponding to timing information for transmitting the uplink data or the PUSCH.

In case that the PUSCH including the timing advance is not indicated to be transmitted earlier than symbol L2, the UE may transmit the PUSCH to the base station. That is, the PUSCH including the timing advance may be transmitted from the UE to the base station at the time when or after the PUSCH including the timing advance becomes equal to the symbol L2, the PUSCH may be transmitted from the UE to the base station. In case that the PUSCH includes the timing advance and is indicated to be transmitted earlier than the symbol L2, the UE may disregard uplink scheduling grant control information from the base station.

Symbol L2 may be the first symbol in which the CP of the PUSCH symbol starts, which should be transmitted after $T_{proc,2}$ from the last time of the PDSCH including the scheduling grant. The $T_{proc,2}$ may be calculated as in Mathematical expression 4 below.

$$T_{proc,2} = ((N_2 + d_{2,1})(2048 + 144) \cdot \kappa \cdot 2^{-\mu}) \cdot T_C \qquad \text{[Mathematical expression 4]}$$

In Mathematical expression 4 as described above, N2, d2,1, κ, μ, and TC may be defined as follows.

If the first symbol among PUSCH-allocated symbols includes only the DMRS, d2,1 becomes d2,1=0, and otherwise, d2,1 becomes d2,1=1.

In case that the UE is configured with a plurality of activated configuration carriers or carriers, the maximum timing difference between carriers may be reflected in the second signal transmission.

N2 is defined as in Table 18 below in accordance with μ. μ=0, 1, 2, and 3 mean respective subcarrier spacings 15 kHz, 30 kHz, 60 kHz, and 120 kHz.

TABLE 18

| μ | PUSCH preparation time $N_2$ [symbols] |
|---|---|
| 0 | 10 |
| 1 | 12 |
| 2 | 23 |
| 3 | 36 |

Different N2 values provided in the above-described Table 18 may be used depending on UE capability.
It is Defined that $T_c=1/(\Delta f_{max} \cdot N_f), \Delta f_{max}=480 \cdot 10^3 Hz, N_f=4096, \kappa=T_s/T_c=64, T_s=1/(\Delta f_{ref} \cdot N_{f,ref}) \Delta f_{ref}=15 \cdot 10^3 Hz, N_{f,ref}=2048$ Meanwhile, the 5G or NR system may configure a frequency band part (BWP) in one carrier, and may designate that a specific UE performs transmission and reception in the configured BWP. This may be for the purpose of reducing power consumption of the UE. The base station may configure a plurality of BWPs, and may change the activated BWP in the control information. The time that the UE can use in changing the BWP may be defined as in Table 19 below.

TABLE 19

| Frequency Range | Scenario | Type 1 delay (us) | Type 2 delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 19, frequency range 1 means a frequency band that is equal to or lower than 6 GHz, and frequency range 2 means a frequency band that is equal to or higher than 6 GHz. In the above-described embodiment, type 1 and type 2 may be determined depending on the UE capability. In the above-described embodiment, scenarios 1, 2, 3, and 4 are given as in Table 20 below.

TABLE 20

|  | Center frequency changed | Center frequency not changed |
|---|---|---|
| Frequency bandwidth changed | Scenario 3 | Scenario 2 |
| Frequency bandwidth not changed | Scenario 1 | Scenario 4 when subcarrier spacing is changed |

Figure 9:
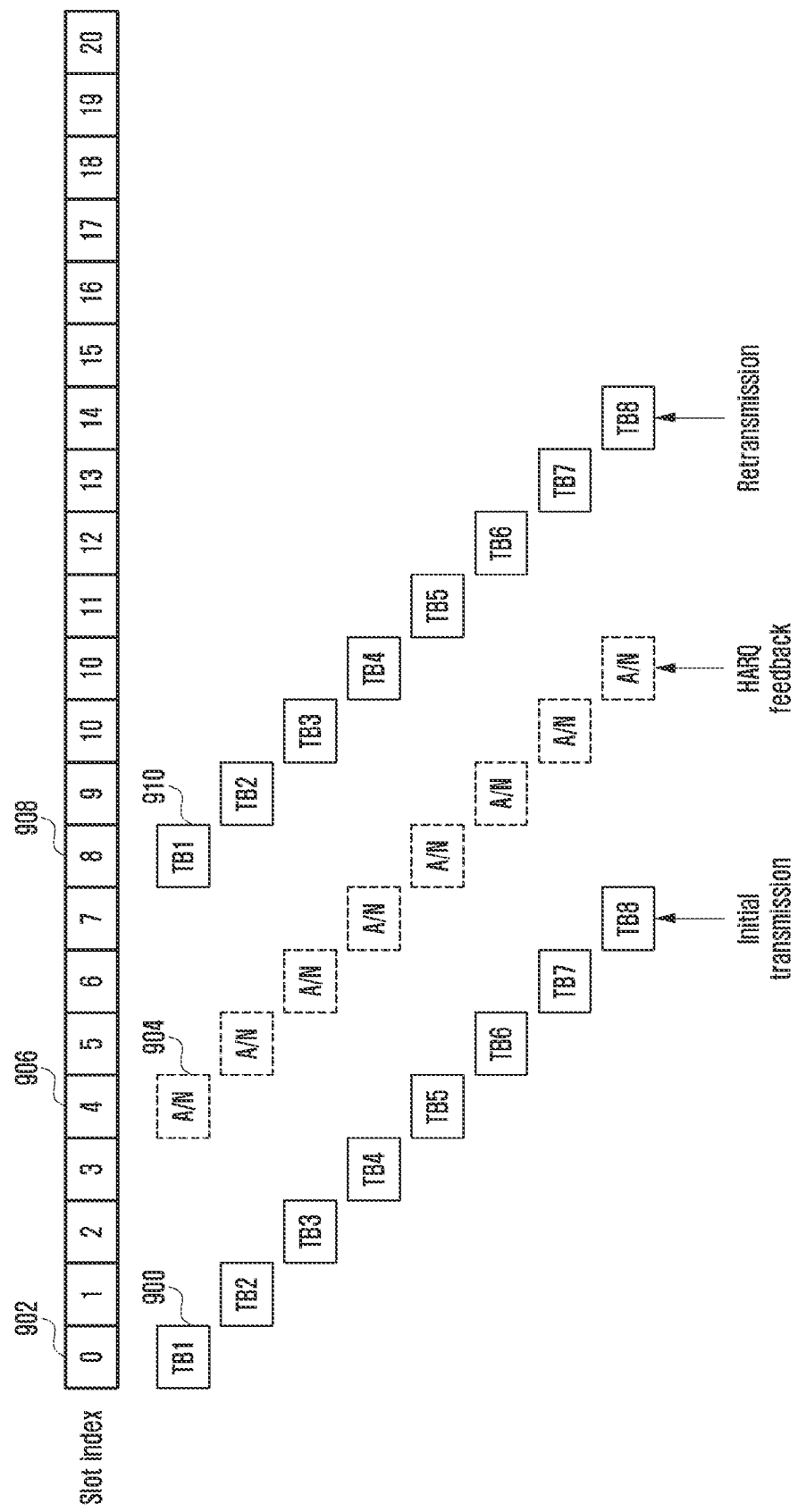
FIG. 9 is a diagram illustrating an example in which data (e.g., TB) is scheduled and transmitted in accordance with a slot, an HARQ-ACK feedback for the corresponding data is received, and retransmission is performed in accordance with the feedback.

FIG. 9 is a diagram illustrating an example in which data (e.g., TB) is scheduled and transmitted in accordance with a slot, an HARQ-ACK feedback for the corresponding data is received, and retransmission is performed in accordance with the feedback. In FIG. 9, TB1 900 is initially transmitted in slot 0 902, and an ACK/NACK feedback 904 for this is transmitted in slot 4 906. If the initial transmission of TB1 has failed, and NACK is received, retransmission 910 for the TB1 may be performed in slot 8 908. As described above, the time when the ACK/NACK feedback is transmitted and the time when the retransmission is performed may be predetermined, or may be determined in accordance with the control information and/or the value indicated through the upper layer signaling.

FIG. 9 illustrates an example in which TB1 to TB8 are sequentially scheduled and transmitted in accordance with a slot from slot 0. For example, the TB1 to TB8 may be transmitted in a state where HARQ process IDs 0 to 7 are given to the TB1 to TB8, respectively. If the number of HARQ process IDs that can be used by the base station and the UE is only 4, transmission of 8 different TBs may not be successively performed.

Figure 10:
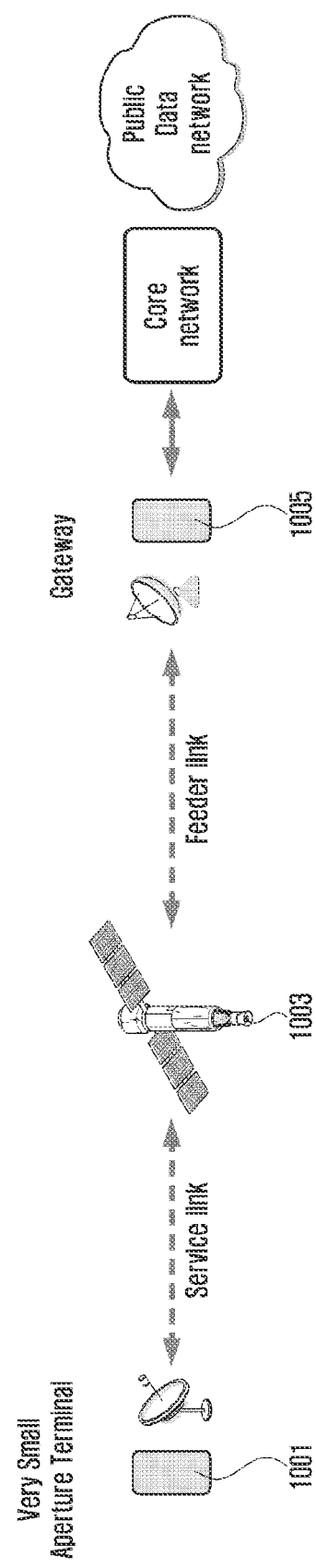
FIG. 10 is a diagram illustrating an example of a communication system using a satellite.

FIG. 10 is a diagram illustrating an example of a communication system using a satellite. For example, if a UE 1001 transmits a signal to a satellite 1003, the satellite 1003 may transfer the signal to a base station 1005. The base station 1005 may processes the received signal, and may retransmit a signal including a request for a subsequent operation to the UE 1001 through the satellite 1003. In the communication system using the satellite of FIG. 10, since the distance between the UE 1001 and the satellite 1003 is far, and the distance between the satellite 1003 and the base station 1005 is also far, the time required for data transmission/reception between the UE 1001 and the base station 1005 is increased.

Figure 11:
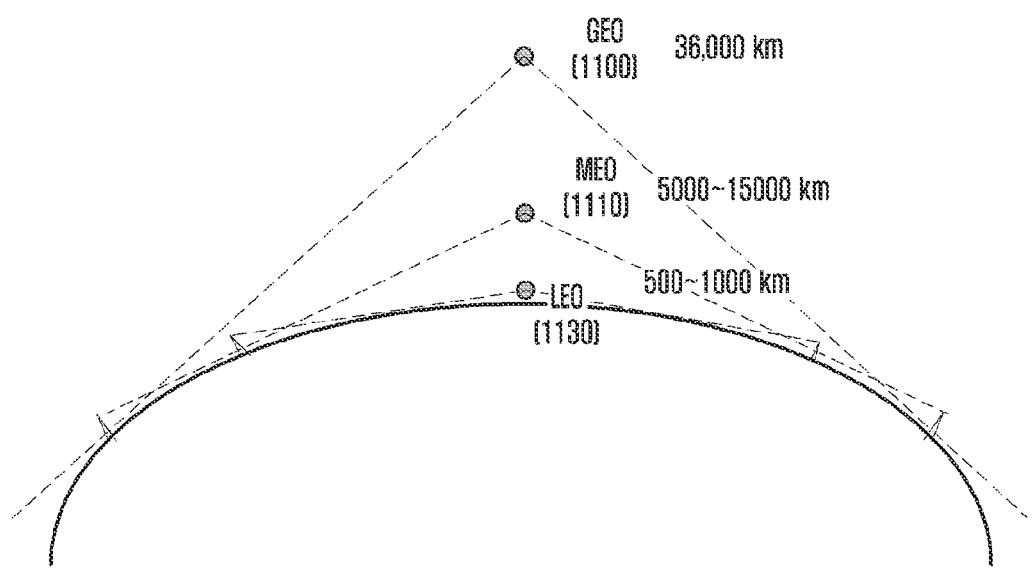
FIG. 11 is a diagram illustrating an earth's orbital cycle of a communication satellite in accordance with an elevation or a height of the satellite.

FIG. 11 is a diagram illustrating an earth's orbital cycle of a communication satellite in accordance with an elevation or a height of the satellite. Satellites for communication may be classified into a low earth orbit (LEO), a middle earth orbit (MEO), and a geostationary earth orbit (GEO) in accordance with the orbits of the satellites. In general, the GEO 1100 means a satellite having an elevation of about 36,000 km, the MEO 1110 means a satellite having an elevation of 5000 to 15,000 km, and the LEO 1130 means a satellite having an elevation of 500 to 1000 km. In accordance with the respective elevations, the earth's orbital cycle differs, and in case of the Geo 1100, the orbital cycle is about 24 hours, in case of the MEO 1110, the orbital cycle is about 6 hours, and in case of the LEO 1130, the orbital cycle is about 90 to 120 minutes. The LEO (~2,000 km) satellite has a relatively low elevation, and thus is advantageous in the propagation delay and the loss in comparison to a stationary orbit (36,000 km) satellite.

Figure 12:
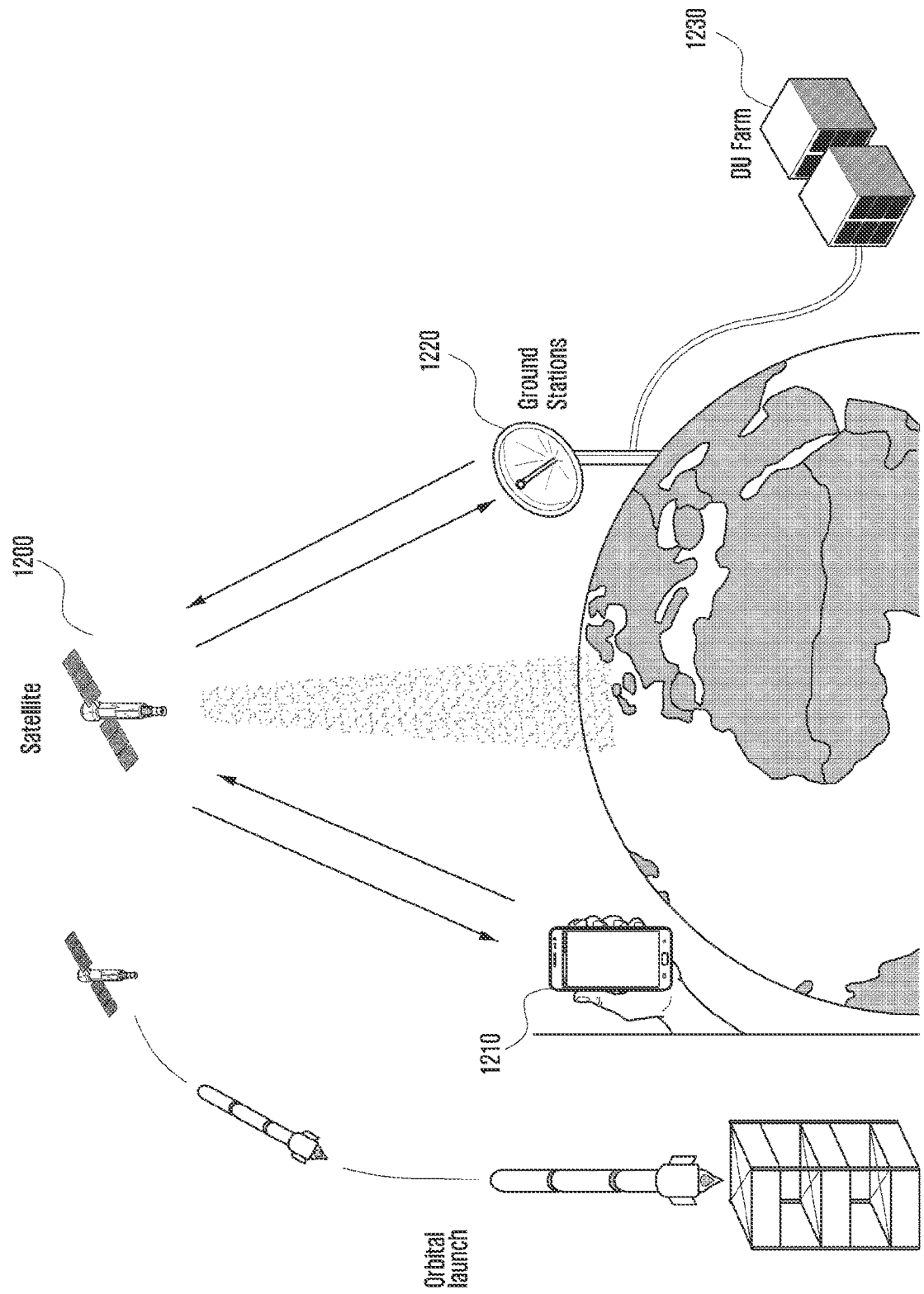
FIG. 12 is a diagram illustrating the concept of a satellite-UE direct communication.

FIG. 12 is a diagram illustrating the concept of a satellite-UE direct communication. A satellite 1200 located at a high place having an elevation of 100 km or more by a rocket may transmit and receive signals to and from the ground UE 1210, and may also transmit and receive signals to and from a ground station 1220 connected to the terrestrial base station (DU farms) 1230.

Figure 13:
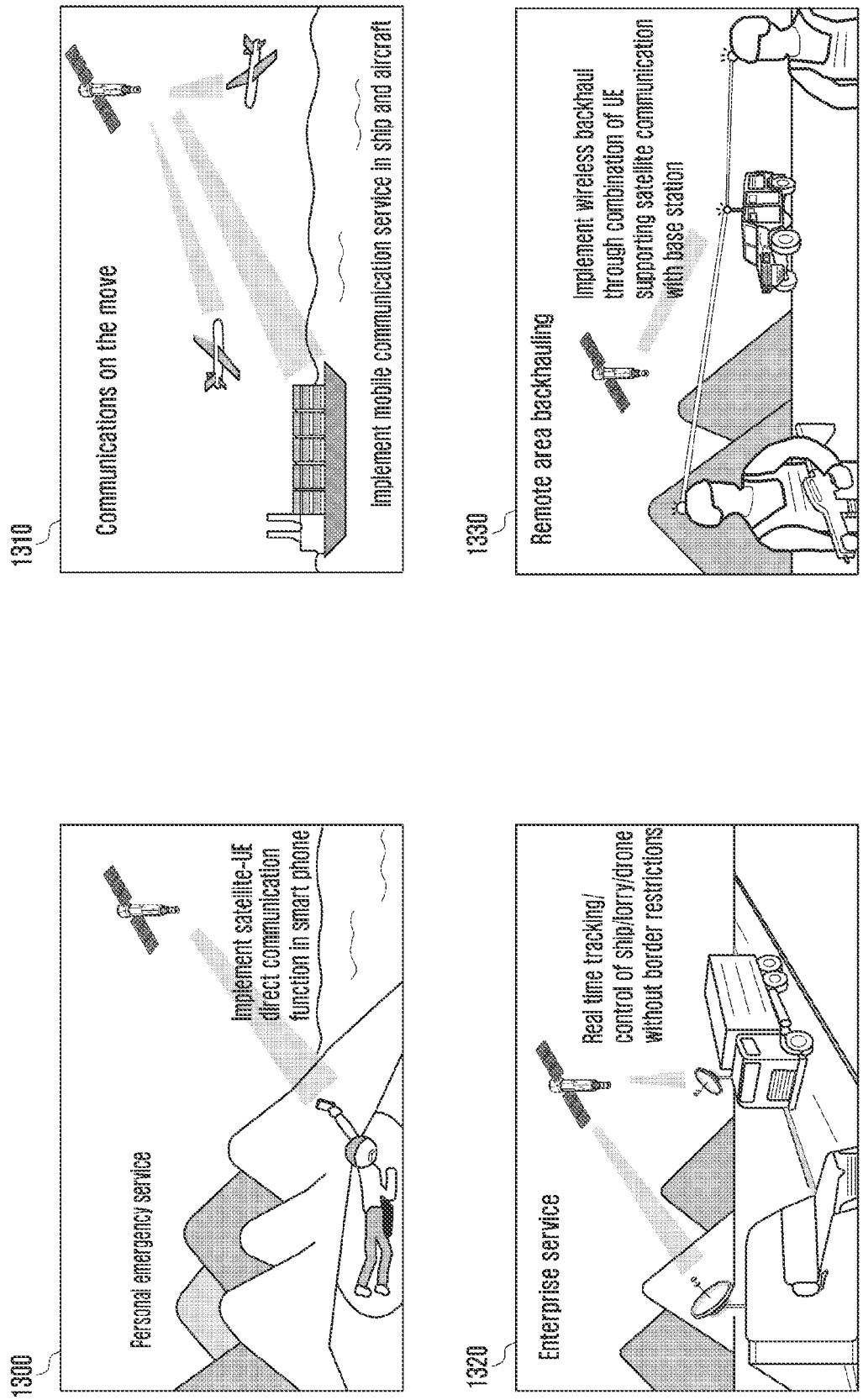
FIG. 13 is a diagram illustrating utilization scenarios of a satellite-UE direct communication.

FIG. 13 is a diagram illustrating utilization scenarios of a satellite-UE direct communication. The satellite-UE direct communication can support a special purpose communication service in the form of supplementing coverage limits of a ground network. As an example, by implementing the satellite-UE direction communication function in the user UE, it is possible to transmit and receive user's emergency rescue or/and disaster signal in a place that is not in the ground network communication coverage (1300), it is possible to provide a mobile communication service for a user in an area in which the ground network communication is not possible, such as a ship or/and aircraft (1310), it is possible to track and control in real time locations of a ship, lorry, or/and drone without border restrictions (1320), and it is possible to utilize a satellite communication so as to perform a backhaul function (1330) in case that the base station is physically far apart in a state where the base station supports the satellite communication function, and functions as a backhaul.

Figure 14:
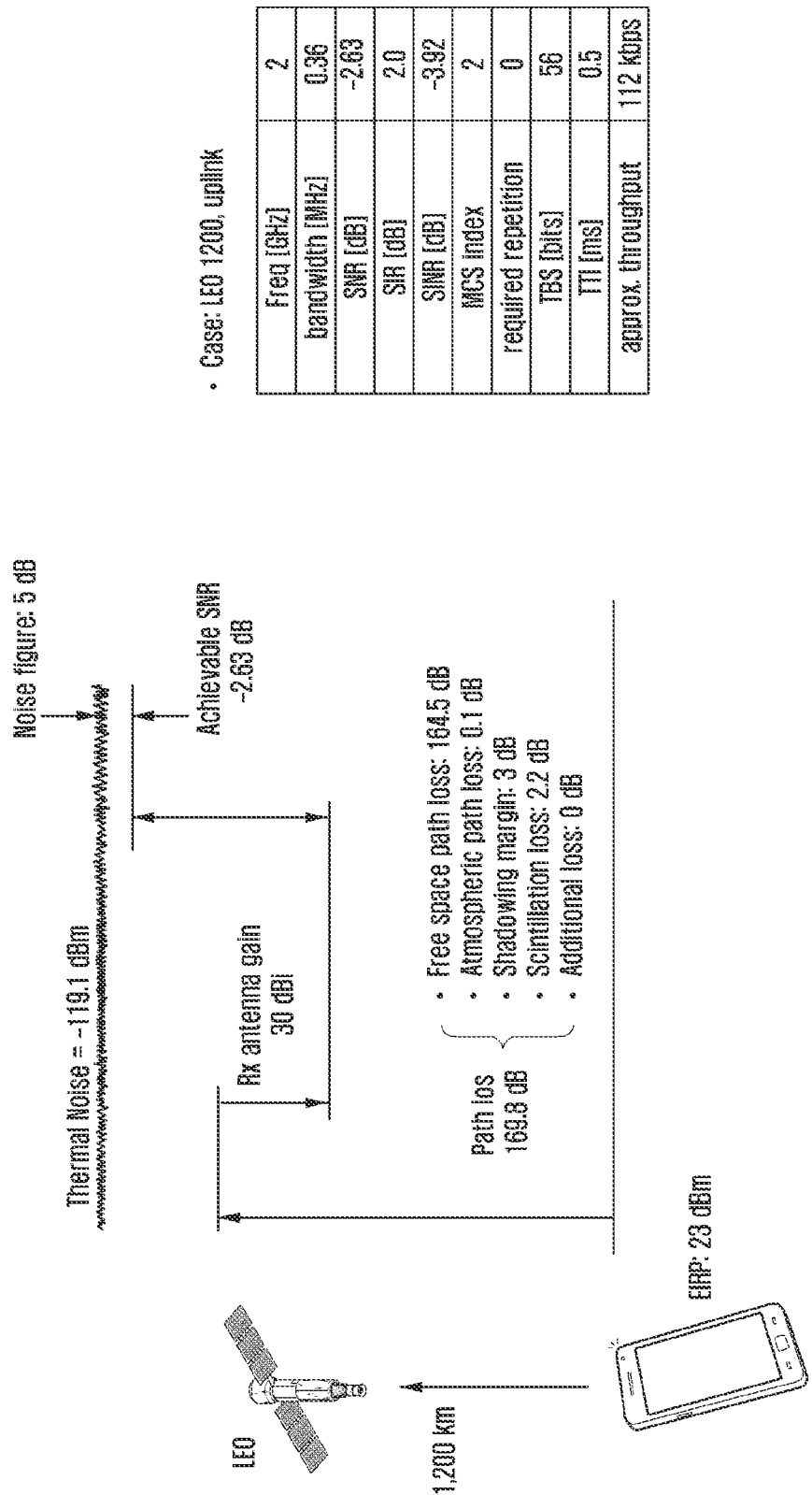
FIG. 14 is a diagram illustrating an example of an expected data throughput calculation in an uplink when an LEO satellite having an elevation of 1200 km and a UE on the ground perform direct communication with each other.

FIG. 14 is a diagram illustrating an example of an expected data throughput calculation in an uplink when an LEO satellite having an elevation of 1200 km and a UE on the ground perform direct communication with each other. In case that in the uplink, the transmission power effective isotropic radiated power (EIRP) of a ground UE is 23 dBm, a path loss of a radio channel up to a satellite is 169.8 dB, and a satellite reception antenna gain is 30 dBi, an achievable signal-to-noise ratio (SNR) may be estimated as −2.63 dB. In this case, the path loss may include a path loss in the free space and a loss in the atmosphere. If it is assumed that the signal-to-interference ratio (SIR) is 2 dB, the signal-to-interference and noise ratio (SINR) is calculated as −3.92 dB, and in this case, if the 30 kHz subcarrier spacing and 1 PRB frequency resource are used, it may be possible to achieve the transmission speed of 112 kbps.

Figure 15:
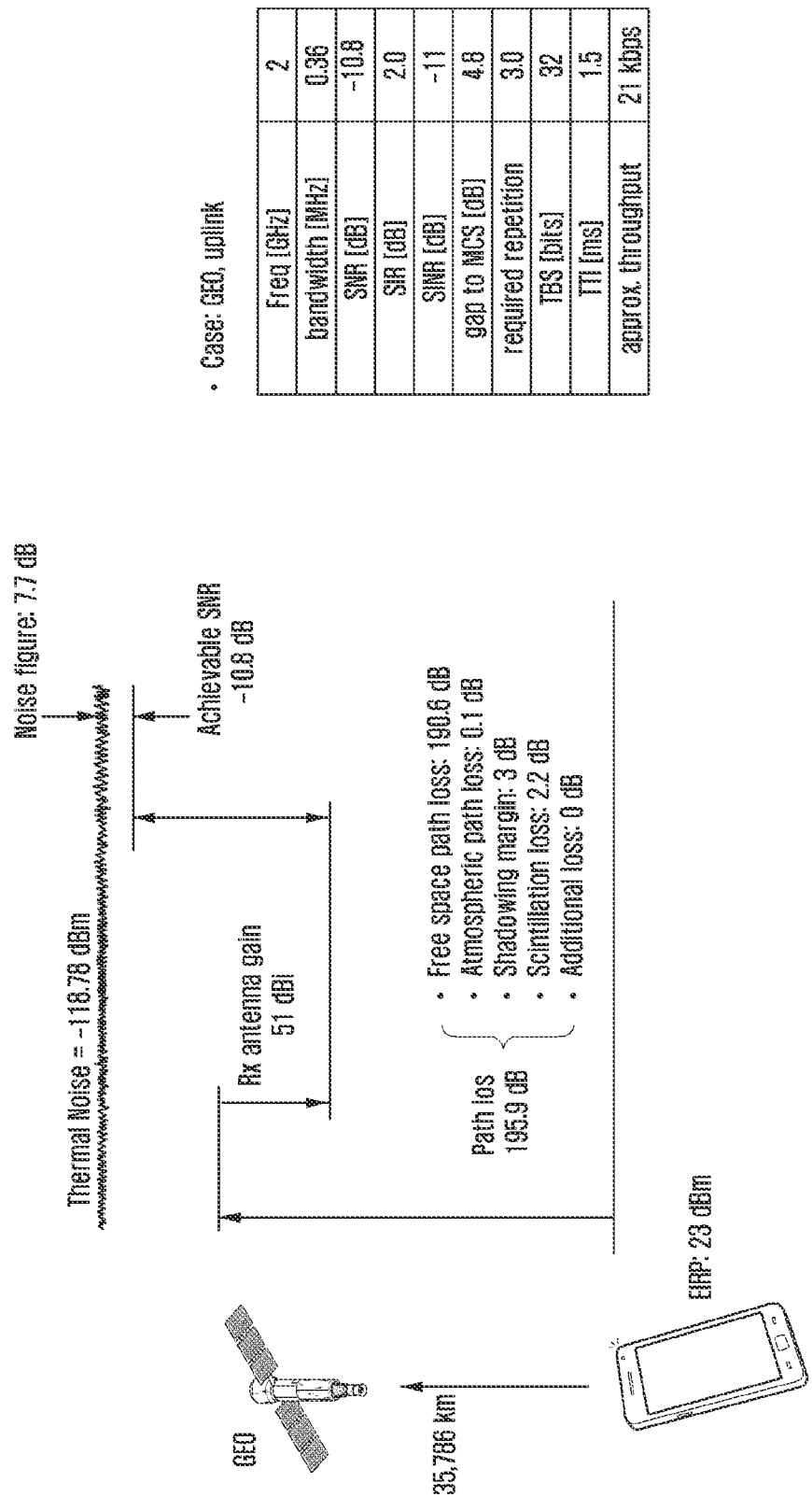
FIG. 15 is a diagram illustrating an example of an expected data throughput calculation in an uplink when a GEO satellite having an elevation of 35,786 km and a UE on the ground perform direct communication with each other.

FIG. 15 is a diagram illustrating an example of an expected data throughput calculation in an uplink when a GEO satellite having an elevation of 35,786 km and a UE on the ground perform direct communication with each other. In case that in the uplink, the transmission EIRP of the ground UE is 23 dBm, the path loss of the radio channel up to the satellite is 195.9 dB, and the satellite reception antenna gain is 51 dBi, the achievable SNR may be estimated as −10.8 dB. In this case, the path loss may include the path loss in the free space and the loss in the atmosphere. If it is assumed that the SIR is 2 dB, the SINR is calculated as −11 dB, and in this case, if the 30 kHz subcarrier spacing and 1 PRB frequency resource are used, it may be possible to achieve the transmission speed of 21 kbps, and this may be the result of performing three times repeated transmission.

Figure 16:
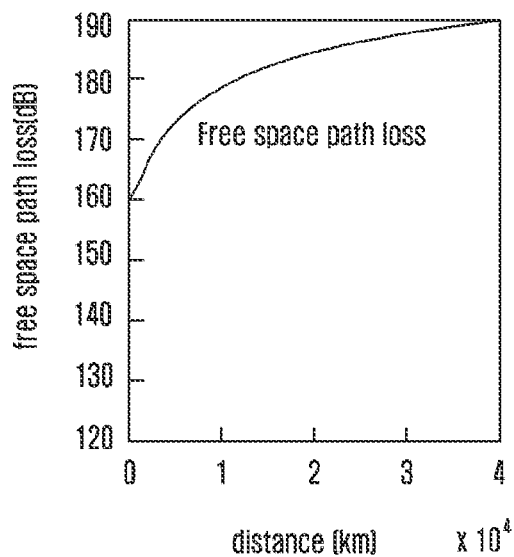
FIG. 16 is a diagram illustrating a path loss value in accordance with a path loss model between a UE and a satellite and a path loss in accordance with a path loss model between the UE and a terrestrial network communication base station.
Figure 16:
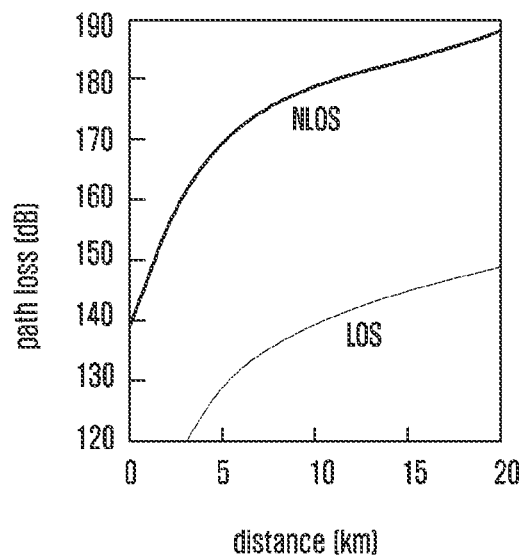

FIG. 16 is a diagram illustrating a path loss value in accordance with a path loss model between a UE and a satellite and a path loss in accordance with a path loss model between the UE and a terrestrial network communication base station. In FIG. 16, d corresponds to a distance, and $f_c$ is a frequency of a signal. In a free space in which UE-satellite communication is performed, the path loss (FSPL) 1600 is in reverse proportion to the square of the distance, but the path loss ($PL_2$ and $PL'_{Uma-NLOS}$) 1610 and 1620 on the air-existing ground on which communication is performed between the UE and a terrestrial gNB may be in reverse proportion to about four squares of the distance. In FIG. 16, d_3D means a straight distance between the UE and the base station, h_BS is the height of the base station, and h_UT is the height of the UE. d'_BP is calculated as d'_BP=4×h_BS×h_UT×$f_c$/c. The $f_c$ is a center frequency in the unit of Hz, and c is the speed of light in the unit of m/x.

In satellite communications (or non-terrestrial network), there may occur a Doppler shift that generates as the satellite continues the fast movement, that is, a frequency offset of the transmitted signal.

Figure 17:
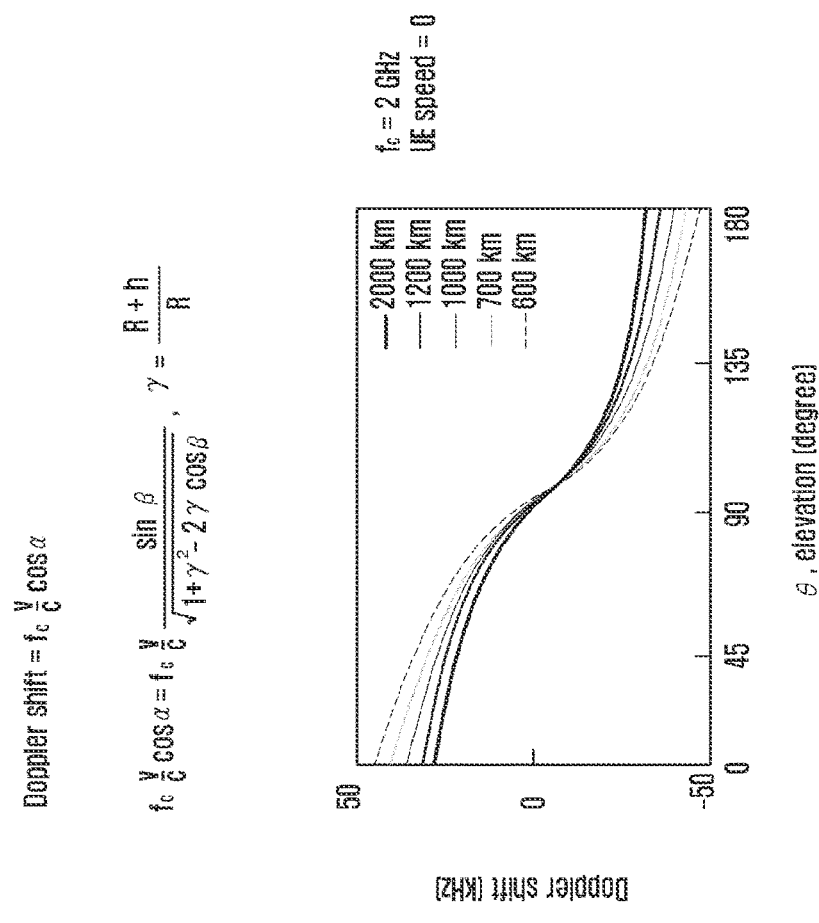
FIG. 17 is a diagram illustrating a mathematical expression and the result of calculating an amount of Doppler shift being experienced by a signal that is transferred from a satellite in accordance with an elevation and a location of the satellite and a location of a ground UE user when the signal is received by the ground user.
Figure 17:
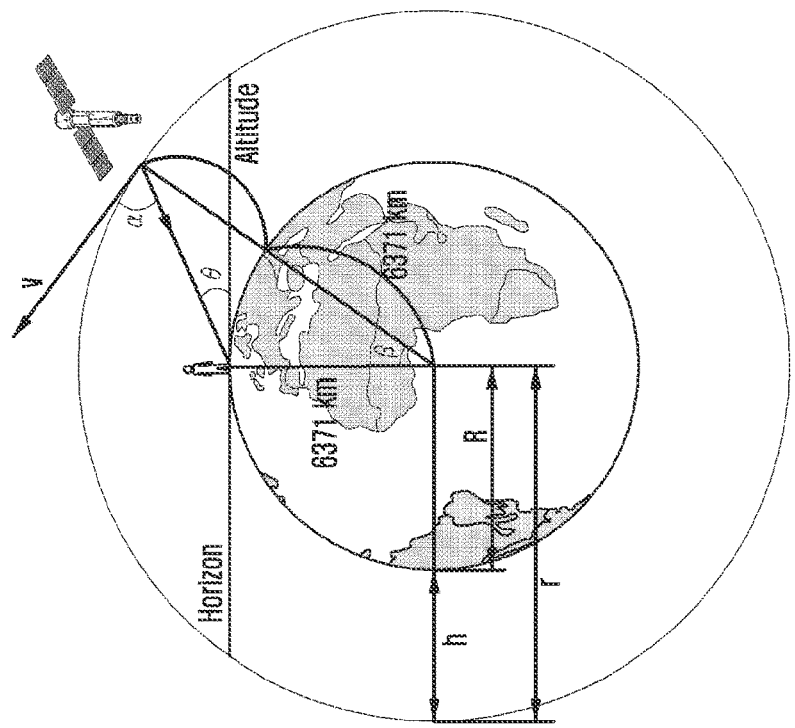
Figure 18:
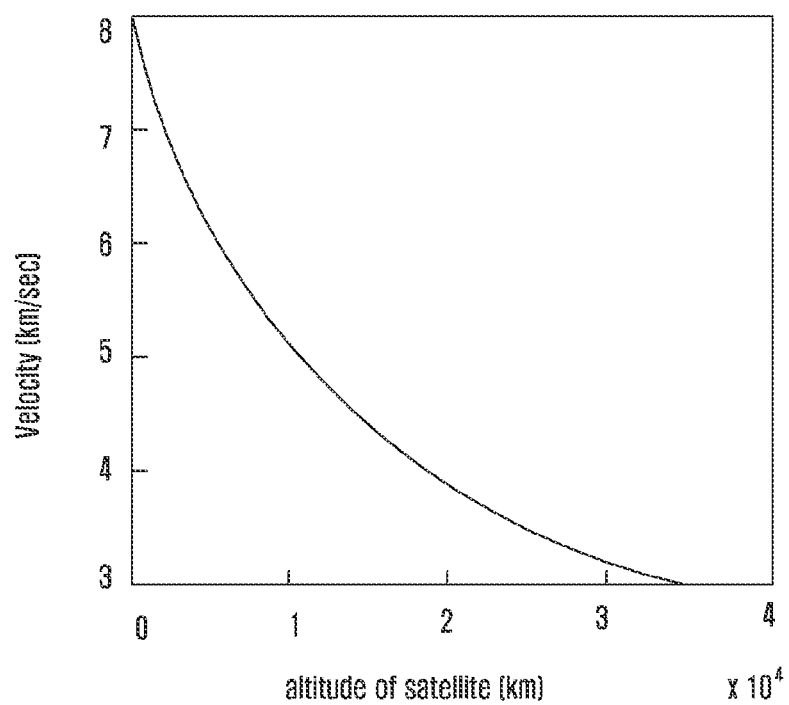
FIG. 18 is a diagram illustrating a speed of a satellite calculated at an elevation of the satellite.

FIG. 17 is a diagram illustrating a mathematical expression and the result of calculating an amount of Doppler shift being experienced by a signal that is transferred from a satellite in accordance with an elevation and a location of the satellite and a location of a ground UE user when the signal is received by the ground user. In FIG. 17, R is an earth radius, h is an elevation of a satellite, v is a speed at which a satellite orbits the earth, and $f_c$ is the frequency of a signal. The speed of the satellite may be calculated based on the elevation of the satellite, and specifically, the speed of the satellite is the speed at which the gravity that is the force for the earth to pull the satellite becomes equal to the centripetal force that is generated as the satellite orbits the earth, and may be calculated as in FIG. 18. FIG. 18 is a diagram illustrating the speed of the satellite calculated at the elevation of the satellite. As can be identified in FIG. 17, since a is determined by an elevation angle θ, the Doppler shift value is determined in accordance with the elevation angle θ.

Figure 19:
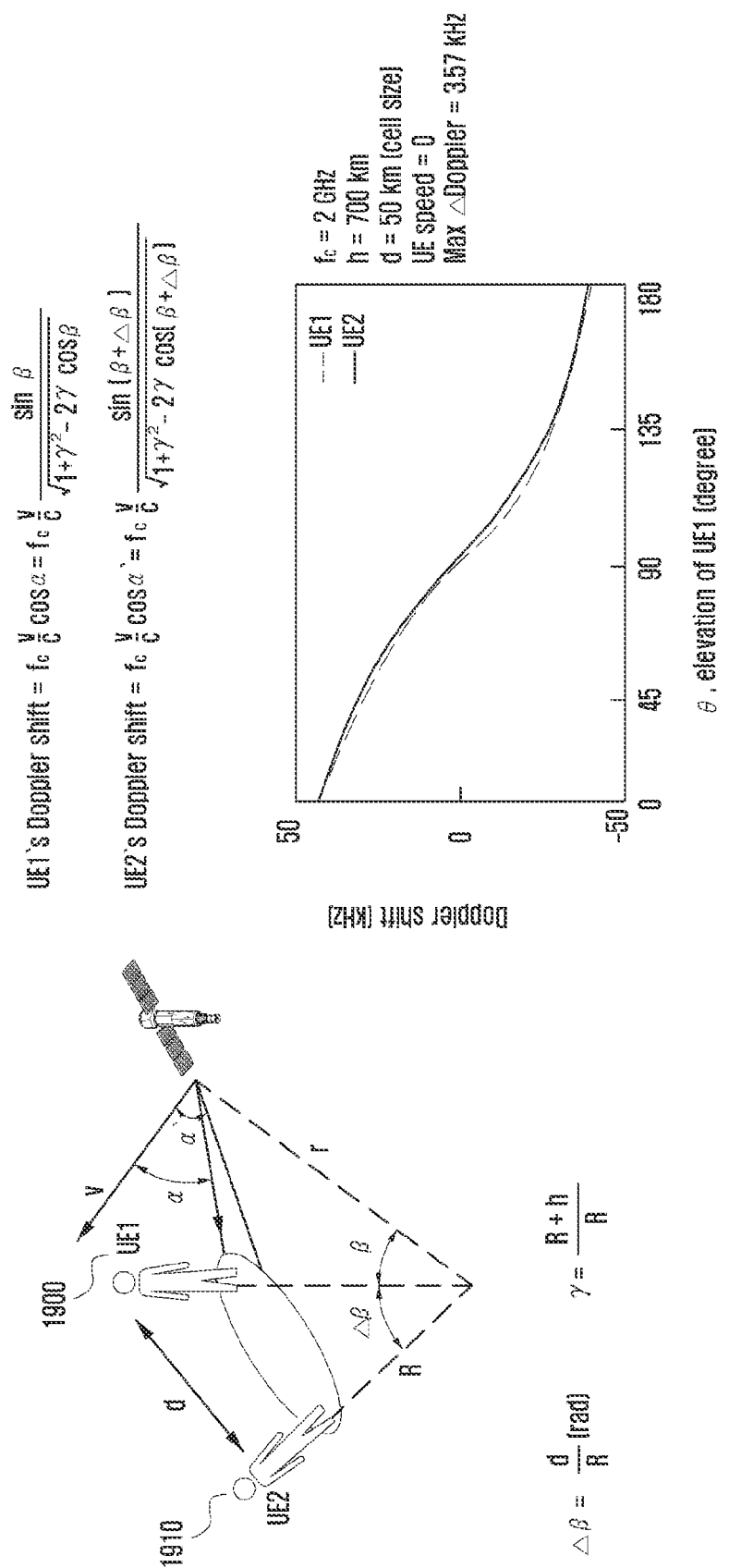
FIG. 19 is a diagram illustrating Doppler shifts experienced by different UEs existing within one beam that a satellite transmits to the ground.

FIG. 19 is a diagram illustrating Doppler shifts experienced by different UEs existing within one beam that a satellite transmits to the ground. In FIG. 19, Doppler shifts experienced by UE 1 1900 and UE 2 1910 in accordance with elevation angles have been calculated. FIG. 19 shows an example on the assumption of a center frequency of 2 GHz, a satellite elevation of 700 km, one beam diameter of 50 km on the ground, and a UE speed of 0. Further, the Doppler shift calculated in the disclosure disregards an effect according to the earth's rotation speed, and since the earth's rotation speed is slow enough in comparison to the speed of the satellite, it may be considered to exert a small influence in calculating the Doppler shift.

Figure 20:
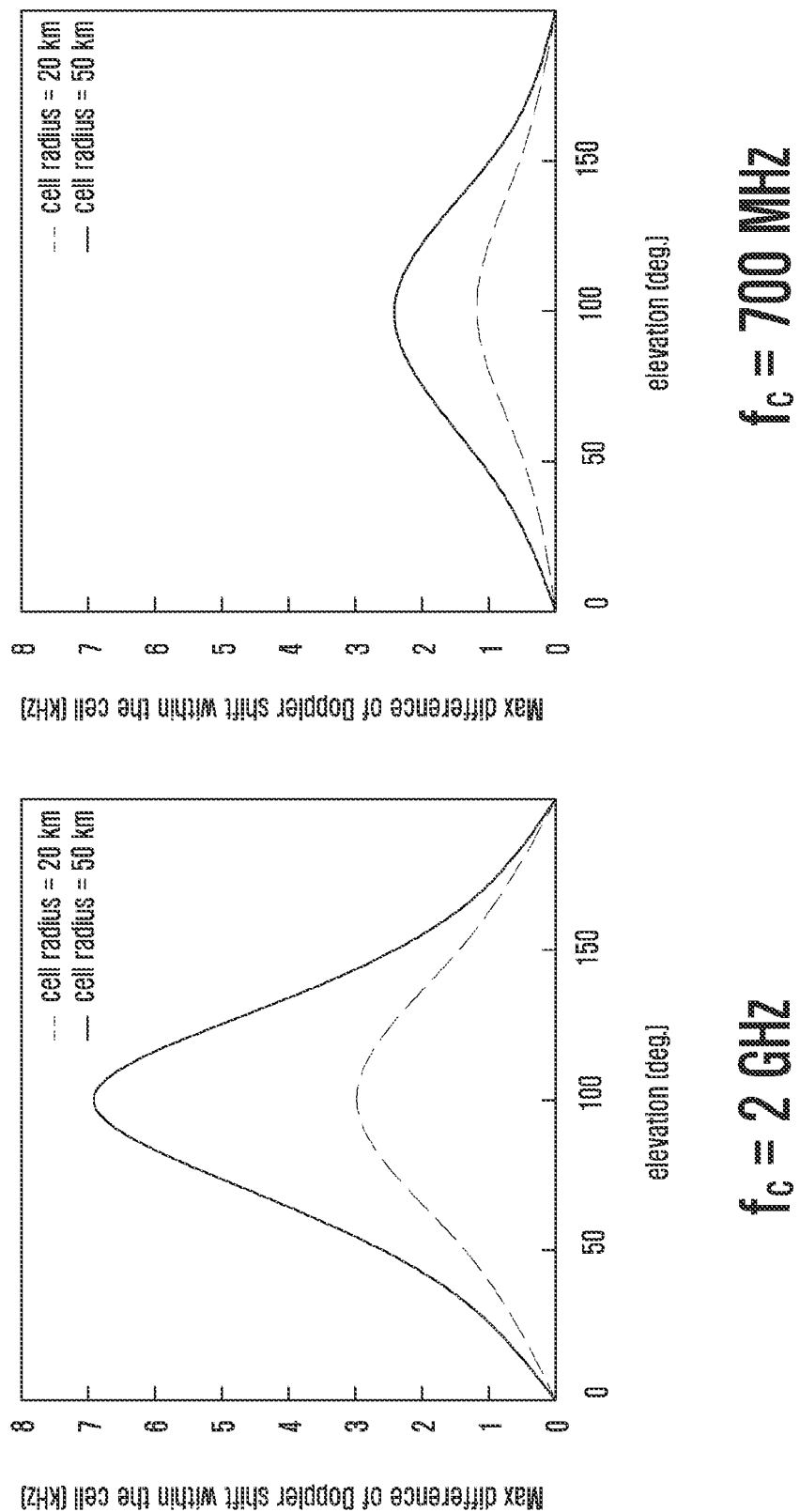
FIG. 20 is a diagram illustrating a Doppler shift difference occurring within one beam in accordance with a location of a satellite that is determined from an elevation angle.

FIG. 20 is a diagram illustrating a Doppler shift difference occurring within one beam in accordance with a location of a satellite that is determined from an elevation angle. When the satellite is located just above a beam, that is, when an elevation angle is 90 degrees, it can be seen that the Doppler shift difference becomes the largest within the beam (or cell). This may be because the Doppler shift values at one end and the other end of the beam have positive and negative values, respectively, when the satellite is above the middle.

Meanwhile, in the satellite communication, since the satellite is far apart from the ground user, large latency may occur in comparison to the terrestrial network communication.

Figure 21:
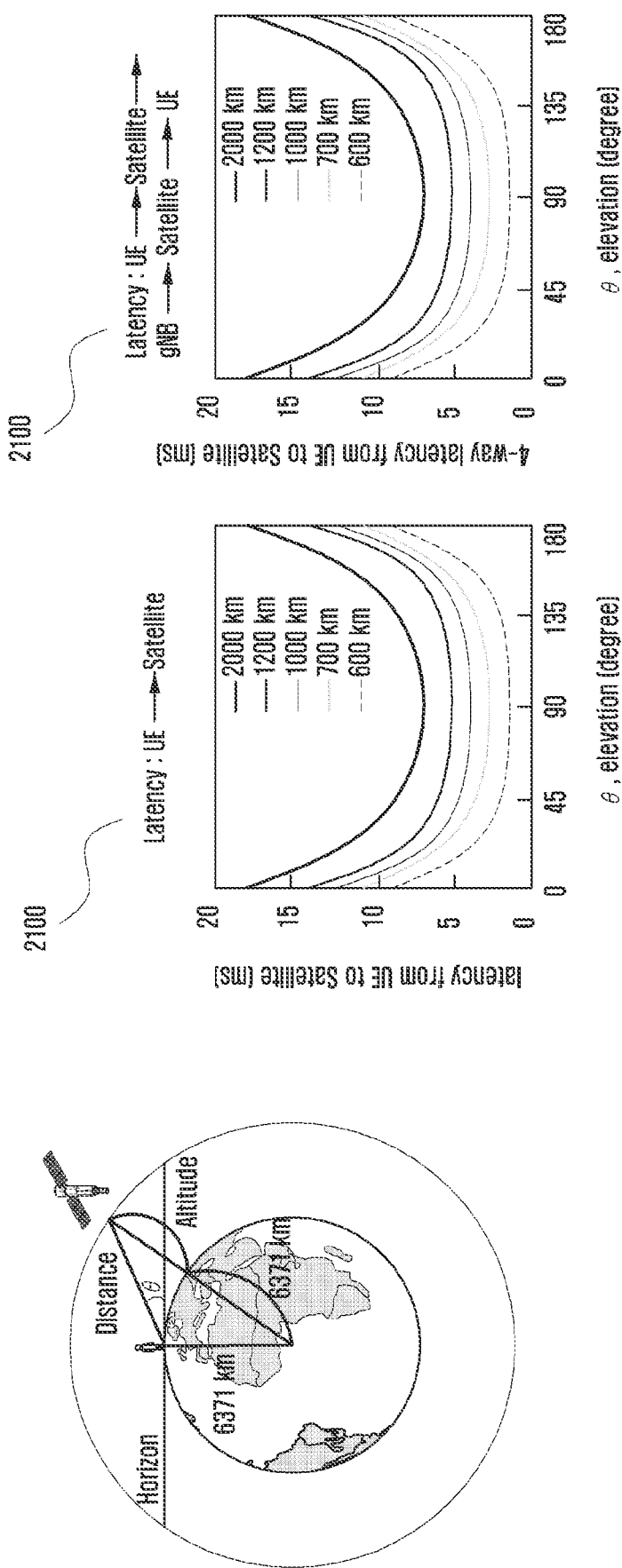
FIG. 21 is a diagram illustrating latency between a UE and a satellite and a round-trip latency among the UE, the satellite, and a base station in accordance with a location of the satellite that is determined from an elevation angle.
Figure 22:
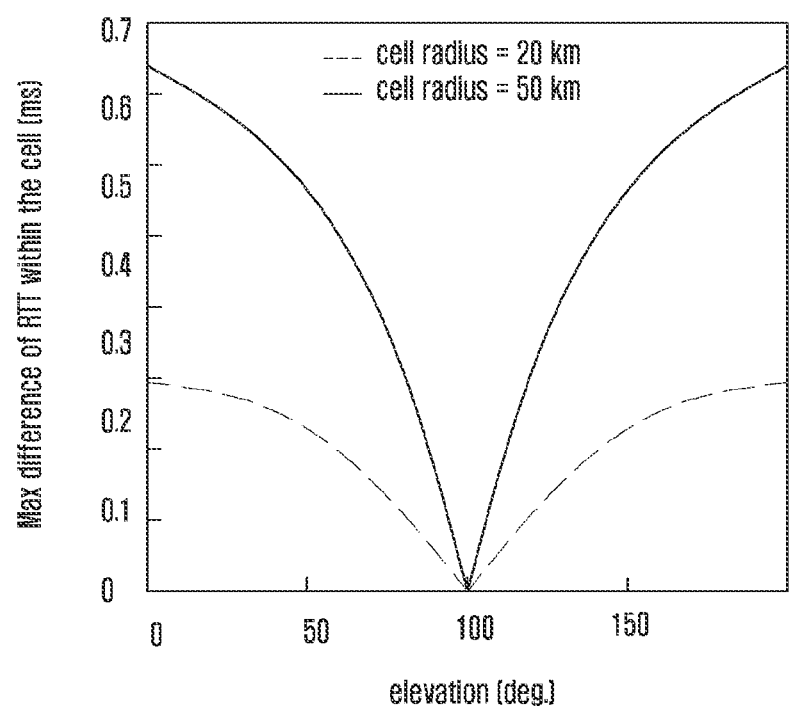
FIG. 22 is a diagram illustrating the maximum difference value of a round-trip latency in accordance with a location of a user within one beam.

FIG. 21 is a diagram illustrating latency between a UE and a satellite and a round-trip latency among the UE, the satellite, and a base station in accordance with a location of the satellite that is determined from an elevation angle. In FIG. 21, 2100 illustrates the latency between the UE and the satellite, and 2110 illustrates a round-trip latency among the UE-satellite-base station. In this case, it is assumed that the latency between the satellite and the base station is equal to the latency between the UE and the satellite. FIG. 22 is a diagram illustrating the maximum difference value of a round-trip latency in accordance with a location of a user within one beam. For example, in case that a beam radius (or cell radius) is 20 km, the difference of the round-trip latency to the satellite that the UEs at different locations in the beam in accordance with the location of the satellite may be equal to or shorter than about 0.28 ms.

In the satellite communication, signal transmission/reception between the UE and the base station may be transfer of the signal through the satellite. That is, in case of the downlink, the satellite may receive the signal that the base station transmits to the satellite, and may transfer the received signal to the UE, and in case of the uplink, the satellite may receive the signal that the UE transmits to the satellite, and may transfer the received signal to the base station. As described above, the satellite having received the signal from the UE or the base station may transfer the received signal to the base station or the UE after performing frequency shift with respect to the received signal, or the satellite may perform signal processing, such as decoding and re-encoding, and then may transfer the processed signal to the base station or the UE.

In case of the LTE or NR, the UE may access the base station through the following procedure.

Operation 1: The UE receives a synchronization signal from the base station. The synchronization signal may include a primary synchronization signal (PSS), a secondary synchronization signal (SSS), and a physical broadcast channel (PBCH). The synchronization signal may include information, such as a slot boundary of the signal transmitted by the base station, a frame number, a downlink, and an uplink configuration. Further, the UE may find a subcarrier offset and scheduling information for system information transmission.

Operation 2: The UE receives system information block (SIB) from the base station. The SIB may include information for performing an initial access and a random access.

Operation 3: A random access preamble is transmitted on the random access resource configured at operation 2. The preamble may be a signal that is determined based on the information configured at operation 2 by using a sequence. The base station receives the preamble transmitted by the UE. The base station attempts reception of the preamble configured on the resource configured by the base station itself in a state where it does not know which UE has sent the preamble, and if the reception has succeeded, the base station is able to know at least one UE has sent the preamble.

Operation 4: If the preamble is received at operation 3, the base station transmits a random access response (RAR) in response to the preamble. The UE having transmitted the random access preamble may receive the RAR transmitted by the base station at this operation. The RAR is transmitted on the PDSCH, and the PDCCH for scheduling this is transmitted together, or is transmitted in advance. The DCI for scheduling the RAR is added with the CRC scrambled based on RA-RNTI, is channel-coded, and then is mapped onto the PDCCH to be transmitted. The RA-RNTI may be determined based on the time and frequency resources on which the preamble at operation 3 is transmitted. The UE having transmitted the random access preamble at operation 3.

Figure 23:
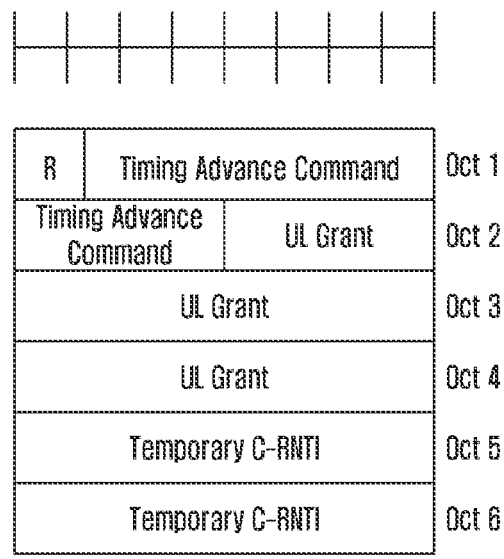
FIG. 23 is a diagram illustrating an example of an information structure of a random access response (RAR).

At this operation, the maximum time limit up to the reception of the RAR can be configured through the SIB being transmitted at operation 2. The maximum time limit may be configured to be limited to 10 ms or 40 ms. For example, if the RAR is not received from the base station within a determined time based on 10 ms that is the configured maximum time, the UE having transmitted the preamble at operation 3 may again transmit the preamble. The RAR may include scheduling information for allocating a resource of the signal transmitted by the UE at operation 5 that is the next operation. FIG. 23 is a diagram illustrating an example of RAR information structure. As illustrated in FIG. 23, the RAR may include information on timing advance (TA) to be applied by the UE and a temporary C-RNTI value to be used from the next operation.

Operation 5: The UE having received the RAR at operation 4 transmits message 3 (msg3) to the base station in accordance with the scheduling information included in the RAR. As described above, the random access preamble may be called message 1 (msg1), and the RAR may be called message 2 (msg2). The UE may include its own ID value in the msg3 to be transmitted. The base station may attempt to receive the msg3 based on the information scheduled by itself at operation 4.

Operation 6: The base station receives the msg3, identifies the ID information of the UE, and then generates message 4 including the ID information to transmit message 4 to the UE. Thereafter, the UE having transmitted the msg3 at operation 5 may attempt to receive the msg4 to be transmitted at operation 6. The UE having received the msg4 may identify whether the msg3 transmitted by the UE itself is received by the base station through comparison of the ID value included after decoding with the ID value transmitted by the UE itself at operation 5. The time required for the UE to receive the msg4 at this operation after the UE transmits the msg3 may be restricted, and the maximum time may be configured based on the SIB at operation 2.

Figure 24:
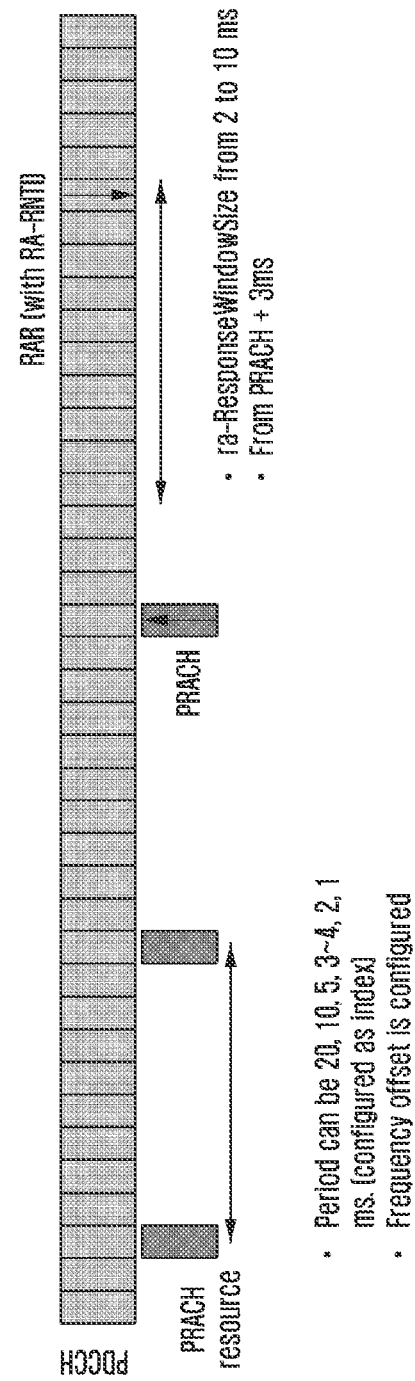
FIG. 24 is a diagram illustrating an example of the relationship between a PRACH preamble configuration resource of an LTE system and a RAR reception time.
Figure 25:
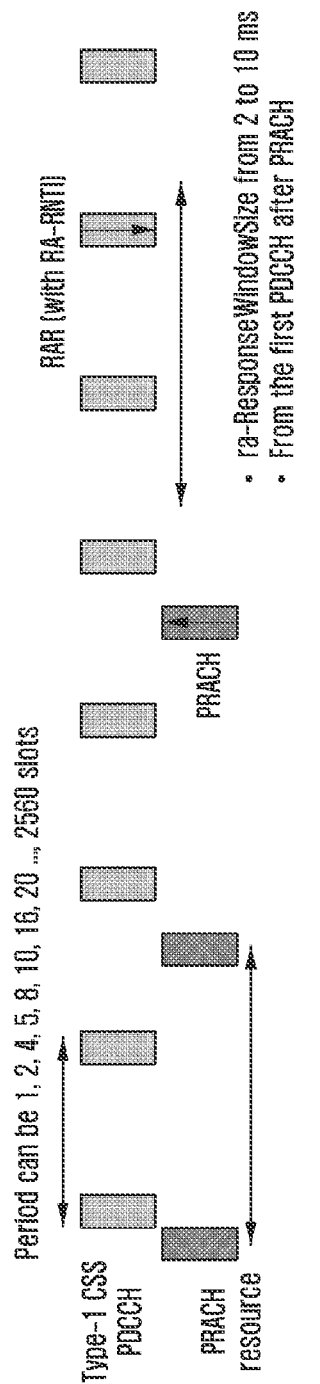
FIG. 25 is a diagram illustrating an example of the relationship between a PRACH preamble configuration resource of a 5G NR system and a RAR reception time.

In case of applying an initial access procedure using the above operation to the satellite communication, the propagation latency that is consumed for the satellite communication may cause a problem. For example, a period (random access window) in which the UE transmits the random access preamble (or PRACH preamble) at operation 3, and can receive the RAR at operation 4, that is, the maximum time taken to be able to receive the same, may be configured through ra-Response Window, and the corresponding maximum time may be configured up to maximally 10 ms in the conventional LTE or the 5G NR. FIG. 24 is a diagram illustrating an example of the relationship between a PRACH preamble configuration resource of an LTE system and a RAR reception time, and FIG. 25 is a diagram illustrating an example of the relationship between a PRACH preamble configuration resource of a 5G NR system and a RAR reception time. With reference to FIG. 24, in case of the LTE, the random access window may start from the time after 3 ms after PRACH (random access preamble) is transmitted. With reference to FIG. 25, in case of the NR, the random access window may start from the control information area for RAR scheduling first appearing after the PRACH (random access preamble) is transmitted.

As an example, the TA for the uplink transmission timing in the 5G NR system may be determined as follows. First, the TA is determined as $T_c=1/(\Delta f_{max} \cdot N_f)$, and here, it is determined that $\Delta f_{max}=480 \cdot 10^3$ Hz and $N_f=4096$. Further, it may be defined as $=T_s/T_c=64$, $T_s=1/(\Delta f_{ref} \cdot N_{f,ref})$, $\Delta f_{ref}=15 \cdot 10^3$ Hz, and $N_{f,ref}=2048$.

Figure 26:
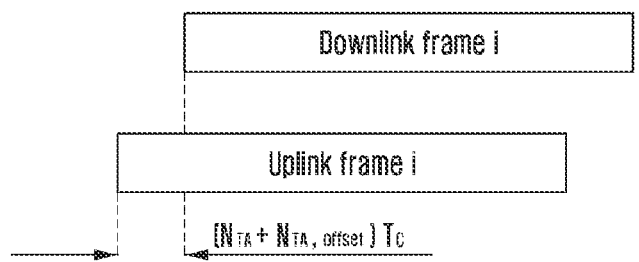
FIG. 26 is a diagram illustrating an example of a downlink frame and uplink frame timing in a UE.

FIG. 26 is a diagram illustrating an example of a downlink frame and uplink frame timing in a UE. The UE may perform the uplink transmission by advancing an uplink frame as much as $N_{TA}=(N_{TA}+N_{TA,offset})T_c$ based on a downlink frame time. As described above, $N_{TA}$ may be transferred from the RAR, or may be determined based on the MAC CE, and $N_{TA,offset}$ may be a value configured to the UE, or determined based on a predetermined value.

In the 5G NR system, the base station may indicate the $T_A$ value to the UE through the RAR, and in this case, one of 0, 1, 2, ..., and 3846 may be indicated as the $T_A$ value. In this case, if the subcarrier spacing (SCS) of the RAR is $2^\mu \cdot 15$ kHz, $N_{TA}$ may be determined as $N_{TA}=T_A 16 \cdot 64/2^\mu$. After completing the random access process, the UE may indicate the variation of the TA from the base station, and this may be indicated through the MAC CE. In this case, the $T_A$ value may be indicated as one of 0, 1, 2, ..., and 63, and may be used to calculate a new TA value through being added to or subtracted from the existing TA value. The TA value may be newly calculated as $$N_{TA_{new}} = N_{TA_{old}} + (T_A - 31) \cdot 16 \cdot 64/2^\mu.$$

The UE may apply the TA value indicated as above to the uplink transmission after the predetermined time.

In the UE-satellite direct communication, since UE-satellite and satellite-base station distances are far, and the satellite moves continuously, time and frequency offsets occur when the signal transmitted by the base station or the UE are received in the UE or the base station. Accordingly, in the disclosure, a method and an apparatus are provided, in which the base station indicates the time and frequency offsets, and accordingly, the UE performs correction so as to correct the time and frequency offsets.

First Embodiment

The first embodiment provides a method and an apparatus in which the base station indicates the frequency offset information to the UE, and the UE applies the indicated value.

The base station may indicate the frequency offset information to the UE by using methods as follows, and the UE may perform transmission/reception of the downlink or uplink signal by correcting the frequency as much as the offset by using the offset information indicated in accordance with the following methods.

Figure 27:
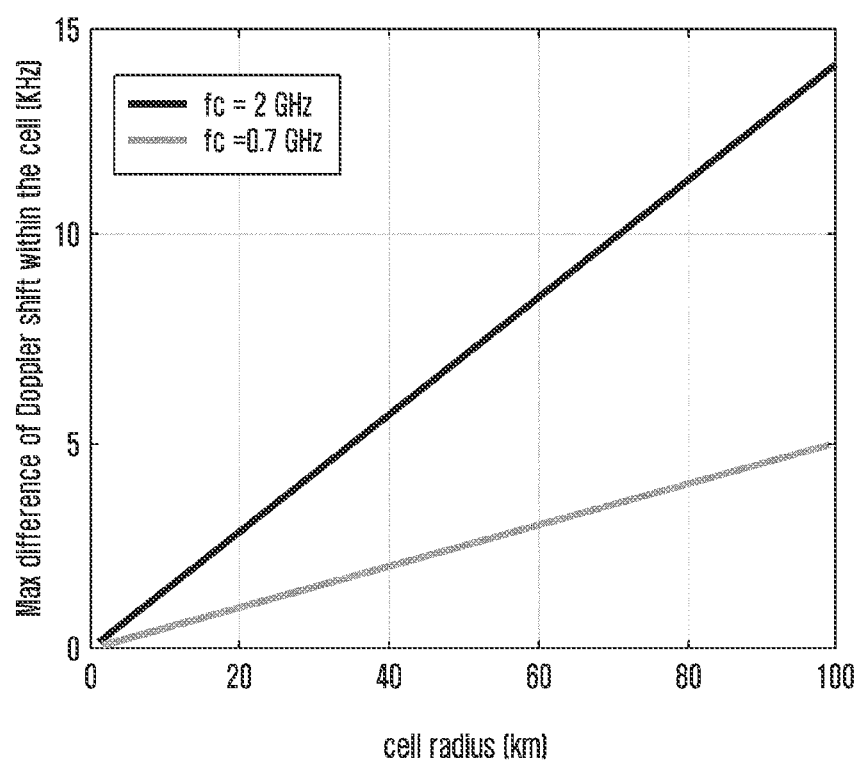
FIG. 27 is a diagram illustrating the maximum value of Doppler shift differences experienced by different UEs existing within one beam in accordance with a size and a center frequency (fc) of a beam in case of an elevation of 700 km of a satellite.

Method 1: The unit of the frequency offset may be determined based on the frequency domain or frequency band (or spectrum). FIG. 27 is a diagram illustrating the maximum value of Doppler shift differences experienced by different UEs existing within one beam in accordance with a size and a center frequency (fc) of a beam in case of an elevation of 700 km of a satellite.

Figure 28:
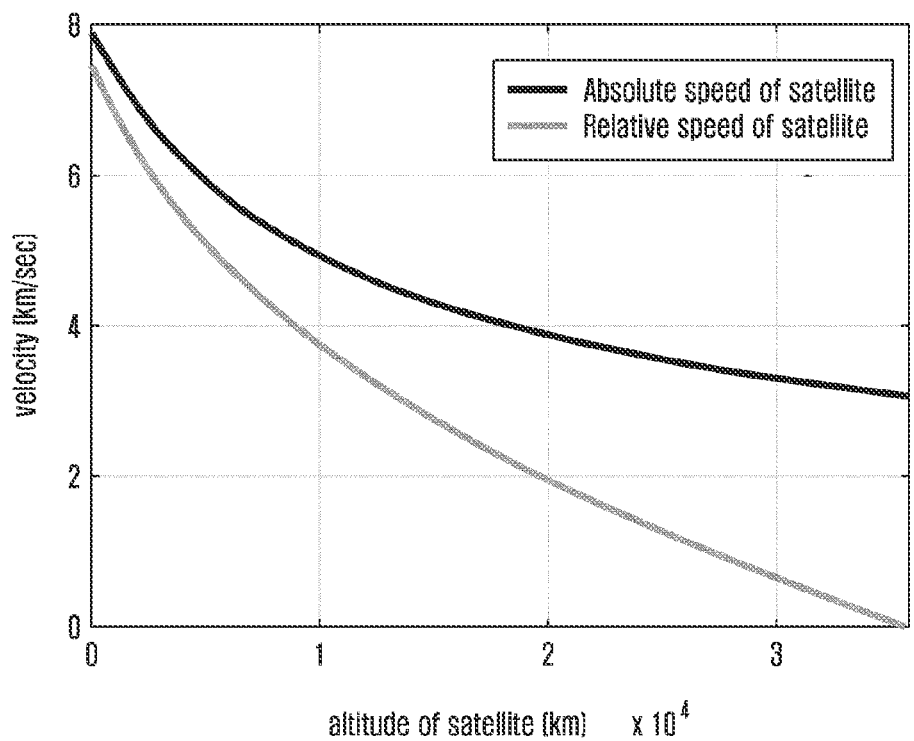
FIG. 28 is a diagram illustrating an absolute speed at which a satellite orbits the earth and a relative speed between the satellite and a stationary object on the ground in accordance with an elevation of the satellite.

As an example, if the radius of the beam (or cell) provided by the satellite is 100 km, two UEs in the beam my experience maximally about 15 kHz Doppler shift difference in the center frequency of 2 GHz. This means that the base station should differently correct the frequency offset of about 15 kHz among different UEs in the uplink transmission. If the radius of the beam (or cell) provided by the satellite is 100 km, two UEs in the beam my experience maximally about 5 kHz Doppler shift difference in the center frequency of 700 MHz (0.7 GHz). This means that the base station should differently correct the frequency offset of about 5 kHz among different UEs in the uplink transmission. As an example, in the frequency domain equal to or lower than 1 GHz, the indication unit of the frequency offset may be $5/(2^{12})$ kHz, that is, 1.2207 Hz. As an example, in the frequency domain exceeding 1 GHz and equal to or lower than 2 GHz, the indication unit of the frequency offset may be $15/(2^{12})$ kHz, that is, 3.6621 Hz. This assumes a case where 12 bits are used to indicate the frequency offset, and may be applied even to a case where different numbers of bits are used. As an example, in case of indicating the frequency offset by using the size of N bits, the indication unit of the frequency offset may be $5/(2^{N})$ kHz. FIG. 28 is a diagram illustrating an absolute speed at which the satellite orbits the earth and a relative speed between the satellite and a stationary object on the ground in accordance with an elevation of the satellite. Since the earth is rotated by itself, even a stationary object on the ground of the earth may be considered to move, and thus an absolute speed of the satellite may be different from a relative speed between the satellite and the earth. The speed of the satellite is the speed at which the influences of the centripetal force and the gravity become equal to each other in order to maintain the elevation of the satellite. Although FIG. 27 illustrates the result of derivation by using the absolute speed of the satellite, the Doppler shift may be calculated based on the relative speed of the satellite as shown in FIG. 28. The Doppler shift may be calculated based on a combination of one or more of a satellite elevation, location, UE location, elevation angle of the UE and the satellite. The relative speed of the satellite may be calculated as a value obtained by subtracting an angular velocity of the earth's rotation from an angular velocity of the satellite that orbits the earth.

Method 2: In accordance with the subcarrier spacing used between the UE and the satellite, the indication unit of the frequency offset may differ. For example, if 1 kHz frequency offset occurs when using 15 kHz subcarrier spacing and 60 kHz subcarrier spacing, the influence by the frequency offset may differ, and for example, the influence becomes much less when using the 60 kHz subcarrier spacing. Accordingly, the indication unit of the frequency offset may be determined as (subcarrier spacing)/($2^{N}$) kHz or $$\frac{15 \times 2^{\mu}}{2^{12}}.$$

As described above, μ is a value that is determined in accordance with the subcarrier spacing, and may mean the μ value that makes the subcarrier spacing $15 \times 2^{\mu}$ kHz in a manner that in case of the 15 kHz subcarrier spacing, the μ becomes μ=0, in case of the 30 kHz subcarrier spacing, the μ becomes μ=1, in case of the 60 kHz subcarrier spacing, the μ becomes μ=2, in case of the 120 kHz subcarrier spacing, the μ becomes μ=3, and in case of the 240 kHz subcarrier spacing, the μ becomes μ=4.

Method 3: The base station may indicate the variation of the frequency offset to the UE. The satellite may regularly move in time, and in a specified time interval, the frequency offset may be linearly changed. Accordingly, the base station may indicate how the UE applies and changes the frequency offset in the future by indicating the variation of the frequency offset to the UE. The variation of the frequency offset may be the change amount of the frequency offset to be applied at a future specific time. With the indication of the frequency offset variation, the base station, together or in advance, may indicate or may configure through upper signaling the time period and the time point for applying the frequency offset variation to the UE as control information. As described above, the upper signaling may be MAC CE or RRC signaling that is not the physical layer signal.

Method 4: The frequency offset information may be indicated in the random access process. As an example, in the random access at operation 4, it may be indicated through the RAR, and in the ransom access at operation 2, it may be indicated through the msg B. In the random access process at operation 2, the UE sends the msg A to the base station, and the base station transmits the msg B to the UE after receiving the msg A. The msg B may include the frequency offset information.

Method 5: The frequency offset information may be included in the MAC CE to be indicated after the random access of the UE.

Method 6: The frequency offset information may be indicated through downlink control information (DCI).

Figure 29:
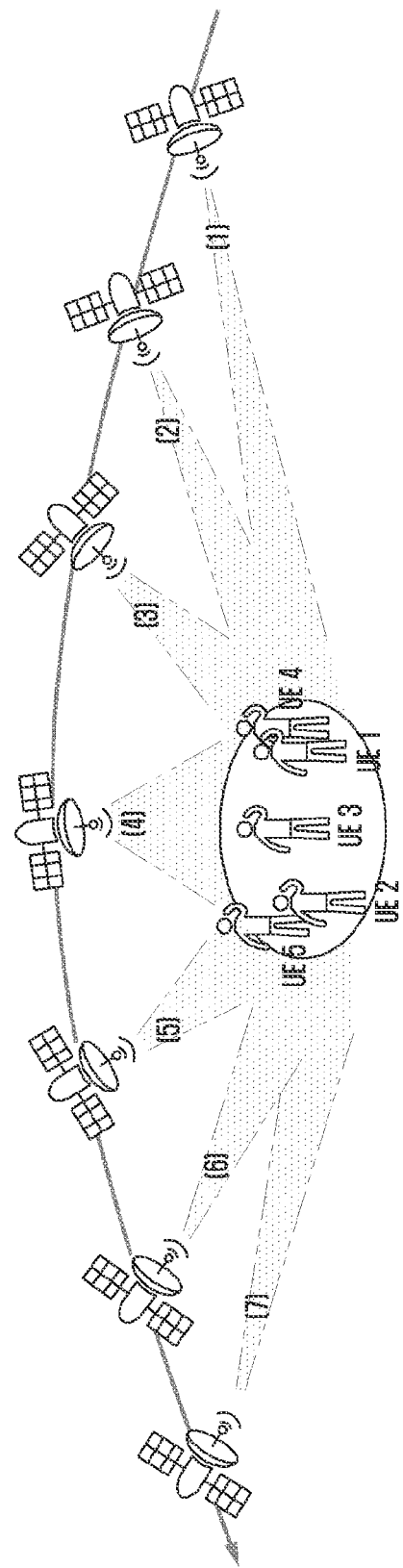
FIG. 29 is a diagram illustrating an example in which the location of a satellite is changed as time goes on, and accordingly, a UE experiences a change of a frequency offset by latency or Doppler effects experienced in UE-satellite communication.
Figure 30:
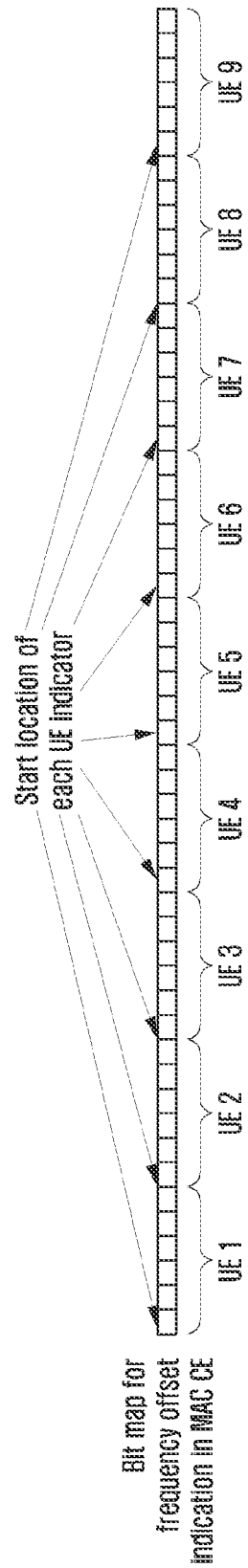
FIG. 30 is a diagram illustrating an example in which frequency offset indication information for several UEs included in one MAC CE when a frequency offset is indicated by using the same MAC CE for one group in the unit of a group.

Method 7: The frequency offset information may be indicated to one or more UEs through the same DCI or the same MAC in a group-common manner. In the method, it is possible to indicate the frequency offset or the frequency offset variation to one or more UEs through the same indication information field. In case of indicating to the respective UEs through different indication information fields, the UEs may preconfigure a bit field location to be interpreted by the UEs or an offset value of the bit field location. FIG. 29 is a diagram illustrating an example in which the location of a satellite is changed as time goes on, and accordingly, a UE experiences a change of a frequency offset by latency or Doppler effects experienced in UE-satellite communication. In FIG. 29, if it is assumed that the satellite orbits the earth in a counterclockwise direction, the satellite starts from location (1), and moves to location (7). When the satellite is located in locations (1) and (7), as the satellite-UE distance becomes far, the latency is increased, and the Doppler shift value is increased. Such Doppler shift influence is illustrated in FIG. 17. As shown in FIG. 29, since the UEs located within one beam area that is provided by the satellite transmit and receive signals to and from the same satellite, they may have similar latency and Doppler shift change values. Accordingly, UEs (UE1, UE2, UE3, UE4, and UE5) of FIG. 29 may perform the time and frequency offset correction for latency and Doppler shift correction by the same indication information. FIG. 30 is a diagram illustrating an example in which frequency offset indication information for several UEs included in one MAC CE when a frequency offset is indicated by using the same MAC CE for one group in the unit of a group. The start location of a frequency offset indicator for each UE may be preconfigured through upper signaling. Although FIG. 30 shows an example in which the frequency offset is indicated in the unit of a group through the MAC CE, the frequency offset may be indicated in the unit of a group through the DCI in a similar manner. That is, the bit field of FIG. 30 may be transmitted as a part of the DCI.

Method 8: The base station may indicate a value to be beam-commonly applied from the system information through the SIB. As an example, the frequency offset f_offset may be calculated as f_offset1+f_offset2, and as described above, f_offset1 may be a value commonly configured or indicated to a UE belonging to the corresponding beam, and f_offset2 may be a value configured or indicated to a specific UE.

Method 9: The base station may configure the unit of the frequency offset to the corresponding UE through the RRC configuration. As an example, the base station may indicate the unit of the frequency offset through the RRC configuration, indicate the number of frequency offset units in the MAC CE or the DCI, and the UE may calculate an accurate frequency offset value through the above-described unit and the number of frequency offset units. As another modification, candidate values of the frequency offset units are indicated through the RRC configuration, and one of them may be indicated through the MAC CE or the DCI.

Method 10: The base station may configure the frequency offset value to the corresponding UE through the RRC configuration. As still another example, the base station may transfer the frequency offset value to the UE through a combination of the RRC configuration and the MAC CE.

One or more of the above methods may be applied in combination. For example, method 1 and method 5 may be combined with each other, and the frequency offset information may be transferred from the MAC CE in accordance with the unit determined based on the frequency domain. Further, as another example, method 1, method 5, and method 7 are combined with each other, and the frequency offset information having the unit determined based on the frequency domain may be transferred to a plurality of UEs through the same MAC CE. For the MAC CE, the plurality of UEs may receive the same DCI and the same PDSCH, and the frequency offset information may be transferred to the UEs through different bit fields of the MAC CE.

As in the above methods, if the base station transfers the frequency offset value information to the UE, the UE may perform the uplink transmission by shifting the uplink center frequency as much as the transferred frequency offset value. The frequency offset indicated to the UE may be transferred through the MAC CE or may be determined to be applied after a specific time point among the time points transferred through the DCI.

Second Embodiment

Second embodiment provides a method and an apparatus in which a base station indicates time offset information to a UE, and the UE applies the indicated value.

Figure 31:
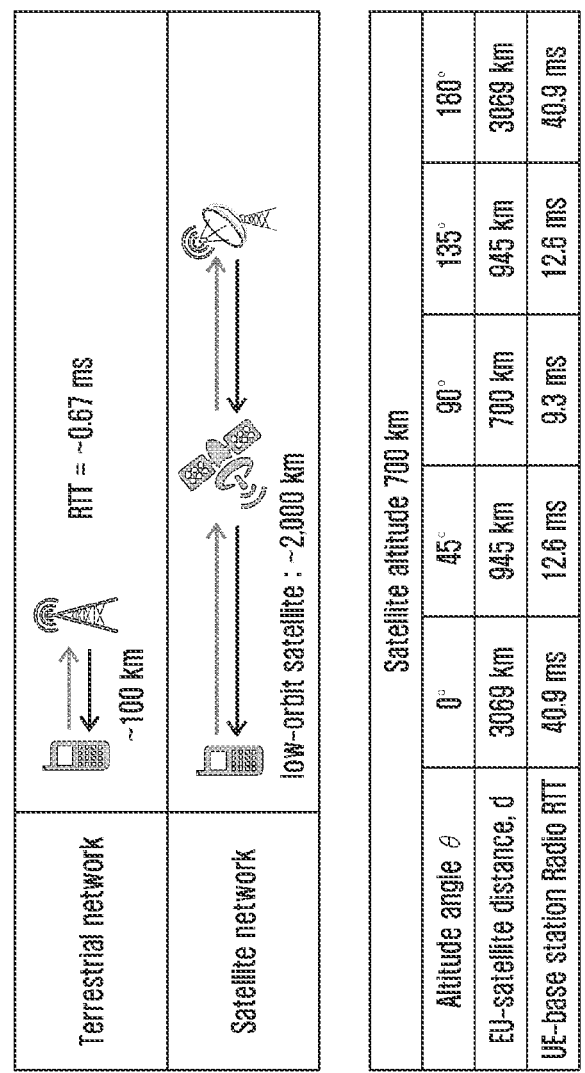
FIG. 31 is a diagram illustrating a difference in propagation latency between a terrestrial network and a satellite network.
Figure 31:
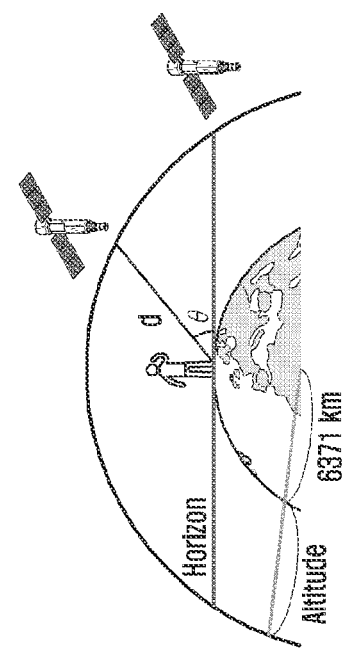

FIG. 31 is a diagram illustrating a difference in propagation latency between a terrestrial network and a satellite network. In a terrestrial network, a propagation latency equal to or lower that 1 ms occurs in consideration of a distance to the base station of maximally about 100 km, whereas in a satellite network, the distance between the UE and the satellite may be several thousands of kilometers, and the distance between the satellite and the base station may also be several thousands of kilometers. Accordingly, much larger latency than the latency of the terrestrial network may be generated. In the satellite network communication, the latency differs in accordance with the elevation and an elevation angle of the satellite, and FIG. 31 illustrates the UE-satellite distance according to then elevation angle and the time required for radio waves to perform a round-trip when the elevation of the satellite is 700 km.

Figure 32:
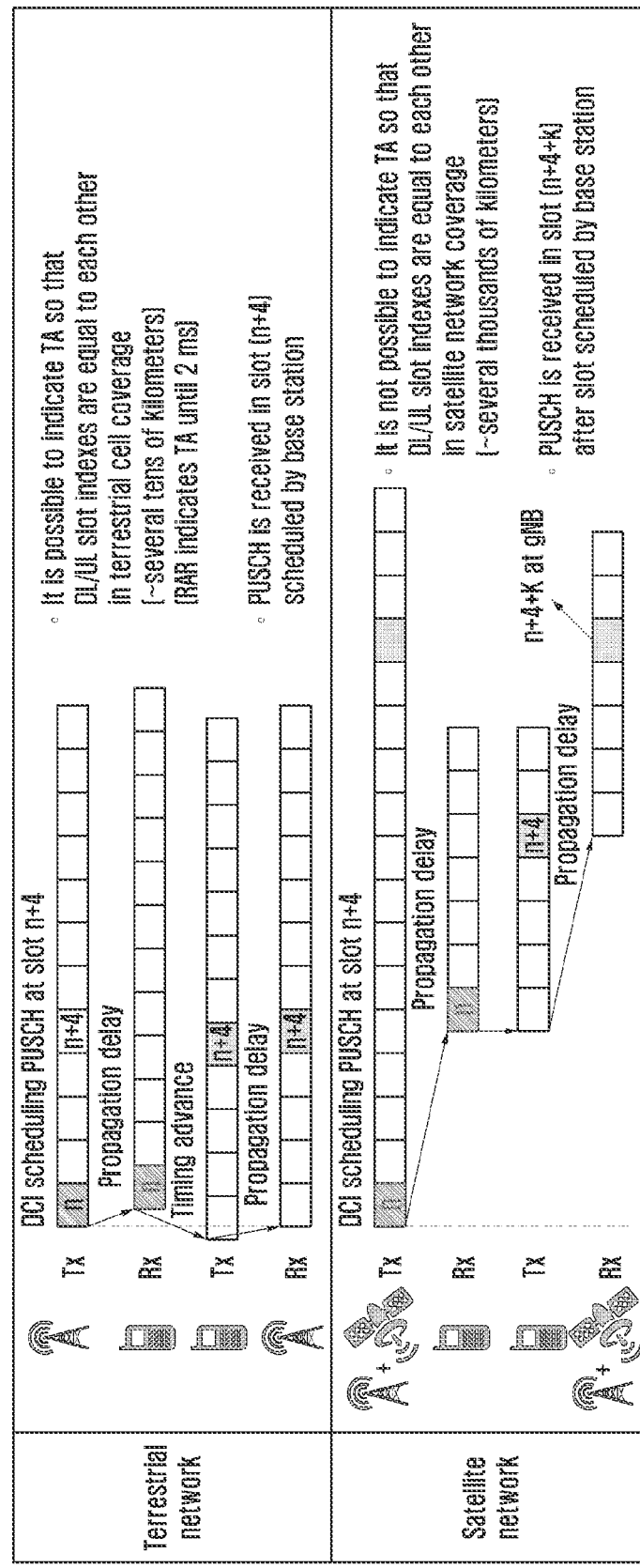
FIG. 32 is a diagram illustrating an example in which timing advance is applied in a terrestrial network and a satellite network.

FIG. 32 is a diagram illustrating an example in which timing advance is applied in a terrestrial network and a satellite network. In the terrestrial network, the maximum latency is within 1 or 2 ms, and it is possible to make the slot timing in which the base station transmits the downlink through the timing advance provided in the LTE and 5G NR system coincide with the slot timing in which the uplink is received. That is, if the UE performs the uplink transmission by advancing the downlink time as much as the timing advance value indicated by the base station, the uplink signal transmitted by the UE coincides with the downlink time point of the base station when the uplink signal is received in the base station. In contrast, in the satellite network, it is not possible to make the slot timing in which the base station transmits the downlink through the timing advance provided in the conventional LTE and 5G NR systems coincide with the slot timing in which the uplink is received, and this is because the propagation latency occurring in the satellite network is several tens of milliseconds, and thus is larger than the maximum timing advance value provided in the conventional LTE and 5GNR systems.

Figure 33:
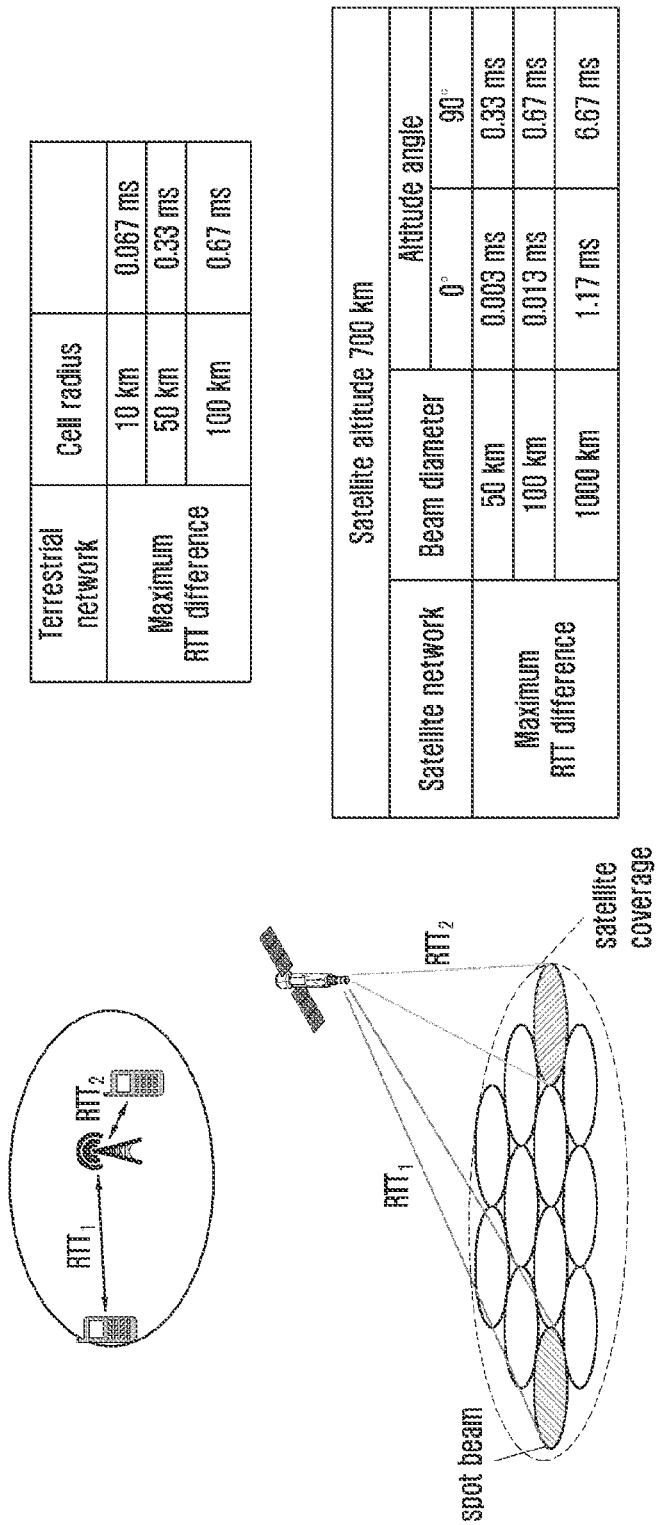
FIG. 33 is a diagram illustrating the maximum value of round-trip propagation latency differences among a UE, a satellite, and a base station experienced by a plurality of users located in one of several beams that the satellite transmits.

FIG. 33 is a diagram illustrating the maximum value of round-trip propagation latency differences among a UE, a satellite, and a base station experienced by a plurality of users located in one of several beams that the satellite transmits. As the beam size becomes smaller, the round-trip propagation latency difference becomes reduced.

Figure 34:
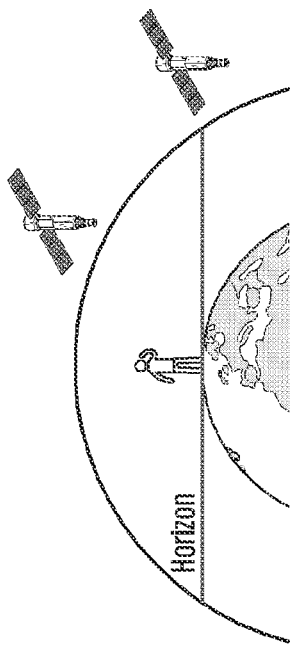

FIG. 34 is a diagram illustrating that a round-trip propagation latency between a UE and a base station is changed while a satellite moves along an orbit as time goes on. With reference to FIG. 34, it can be identified that in the terrestrial network, the latency is somewhat changed, whereas in the satellite network, the change amount of the latency becomes very large according to the time.

The base station may indicate the time offset information to the UE by using methods as follows, and the UE may perform transmission/reception of the downlink or uplink signal by correcting the time as much as the offset by using the offset information indicated in accordance with the following methods.

Method 1: Based on the frequency domain or the frequency band (spectrum), the indication range of the latency, or the size of the bit field for the latency indication or timing advance indication may be determined. As an example, 12 bits are used in the center frequency equal to or lower than 1 GHz, and 16 bits are used in the center frequency that exceeds 1 GHz.

Method 2: The base station may indicate the variation of the timing advance to the UE.

The satellite may regularly move in time, and in a specified time interval, the latency may be linearly changed. Accordingly, the base station may indicate how the UE applies and changes the TA in the future by indicating the variation of the latency or the timing advance to the UE. The variation of the time offset (or timing advance) may be the change amount of the TA to be applied at a future specific time. With the indication of the time offset variation, the base station, together or in advance, may indicate or may configure through upper signaling the time period and the time point for applying the time offset variation to the UE as control information. As described above, the upper signaling may be MAC CE or RRC signaling that is not the physical layer signal.

Method 3: The time offset (or timing advance) information may be indicated to one or more UEs through the same DCI or the same MAC in a group-common manner. In the method, it is possible to indicate the timing advance or the TA variation to one or more UEs through the same indication information field or through the different indication information fields. In case of indicating to the respective UEs through different indication information fields, the UEs may preconfigure a bit field location to be interpreted by the UEs or an offset value of the bit field location. As shown in FIG. 29, since the UEs located within one beam area that is provided by the satellite transmit and receive signals to and from the same satellite, they may have similar latency and Doppler shift change values. Accordingly, UEs (UE1, UE2, UE3, UE4, and UE5) of FIG. 29 may perform the time offset correction for latency and timing advance value correction by the same indication information. FIG. 30 is a diagram illustrating an example in which time offset indication information for several UEs included in one MAC CE when a time offset is indicated by using the same MAC CE for one group in the unit of a group. The start location of a time offset indicator for each UE may be preconfigured through upper signaling. Although FIG. 30 shows an example in which the time offset is indicated in the unit of a group through the MAC CE, the time offset may be indicated in the unit of a group through the DCI in a similar manner. That is, the bit field of FIG. 30 may be transmitted as a part of the DCI.

Method 4: The base station may indicate a value to be beam-commonly applied from the system information through the SIB. As an example, the time offset TA_offset may be calculated as TA_offset1+TA_offset2, and as described above, TA_offset1 may be a value commonly configured or indicated to a UE belonging to the corresponding beam, and TA_offset2 may be a value configured or indicated to a specific UE.

Method 5: The base station may configure the unit of the time offset to the corresponding UE through the RRC configuration. As an example, the base station may indicate the unit of the time offset through the RRC configuration, indicate the number of time offset units in the MAC CE or the DCI, and the UE may calculate an accurate time offset value through the above-described unit and the number of time offset units. As another modification, candidate values of the time offset units are indicated through the RRC configuration, and one of them may be indicated through the MAC CE or the DCI.

Method 6: The base station may configure the time offset value to the corresponding UE through the RRC configuration. As still another example, the base station may transfer the time offset value to the UE through a combination of the RRC configuration and the MAC CE.

As described above, for convenience in explanation, although the first embodiment and the second embodiment of the disclosure have been dividedly explained, the respective embodiments include operations related to each other, and it is also possible to configure at least two embodiments in combination.

Figure 35:
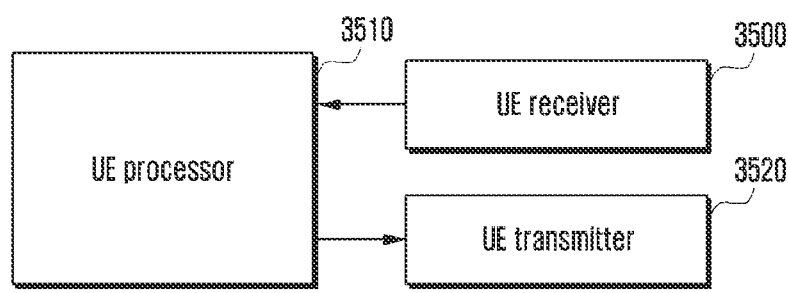
FIG. 35 is a block diagram illustrating the internal structure of a UE according to an embodiment of the disclosure.
Figure 36:
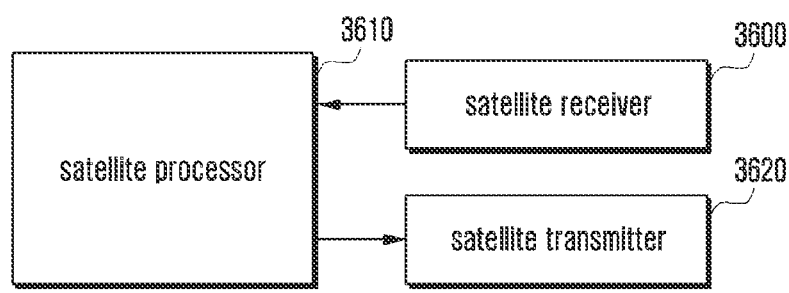
FIG. 36 is a block diagram illustrating the internal structure of a satellite according to an embodiment of the disclosure.
Figure 37:
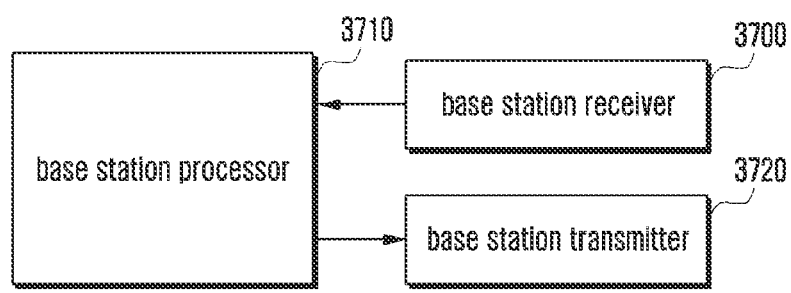
FIG. 37 is a block diagram illustrating the internal structure of a base station according to an embodiment of the disclosure.

In order to perform the above-described embodiments, a transmitter, a receiver, and a processor of a UE, a satellite, and a base station are illustrated in FIGS. 35, 36, and 37. In order to perform the operation for determining signal transmission/reception in the first to second embodiments, the base station, the satellite, and the UE, or a transmitting and receiving method of the transmitting end and the receiving end may be represented, and in order to perform the same, the receiver, the processor, and the transmitter of the UE may operate according to the respective embodiments.

Specifically, FIG. 35 is a block diagram illustrating the internal structure of a UE according to an embodiment of the disclosure. As illustrated in FIG. 35, a UE according to the disclosure may include a UE receiver 3500, a UE transmitter 3520, and a UE processor 3510. In an embodiment of the disclosure, the UE receiver 3500 and the UE transmitter 3520 may be commonly called a transceiver. The transceiver may transmit and receive signals to and from a base station. The signal may include control information and data. For this, the transceiver may be composed of an RF transmitter for up-converting and amplifying the frequency of a transmitted signal, and an RF receiver for low-noise-amplifying and down-converting the frequency of a received signal.

Further, the transceiver may receive a signal on a radio channel, and may output the received signal to the UE processor 3510. Further, the transceiver may transmit the signal that is output from the UE processor 3510 on the radio channel. The UE processor 3510 may control a series of processes so that the UE operates according to the above-described embodiments of the disclosure. For example, the UE receiver 3500 may receive the signal from the satellite or the terrestrial base station, and the UE processor 3510 may transmit and receive the signal to and from the base station. Thereafter, the UE transmitter 3520 may transmit the signal by using the determined time point.

FIG. 36 is a block diagram illustrating the internal structure of a satellite according to an embodiment of the disclosure. As illustrated in FIG. 36, a satellite according to the disclosure may include a satellite receiver 3600, a satellite transmitter 3620, and a satellite processor 3610. As described above, the pluralities of receivers, transmitters, and processors may be provided. That is, the receiver and the transmitter for transmission/reception from the UE, and the receiver and the transmitter for transmission/reception from the base station may be provided. The satellite receiver 3600 and the satellite transmitter 3620 may be commonly called a satellite transceiver.

The transceiver may transmit and receive signals to and from the UE and the base station. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal on a radio channel, and may output the received signal to the satellite processor 3610. Further, the transceiver may transmit the signal that is output from the satellite processor 3610 on the radio channel. The satellite processor 3610 may include a compensator (pre-compensator) for compensating for the frequency offset or Doppler shift, and may include a device capable of tracking the location from GPS and the like. Further, the satellite processor 3610 may include a frequency shift function capable of moving the center frequency of the received signal. According to an embodiment of the disclosure as described above, the satellite processor 3610 may control a series of processes so that the satellite, the base station, and the UE can operate. For example, the satellite receiver 3600 may receive a PRACH preamble from the UE, transmit again the following RAR to the UE, and determine to transmit the information to the base station. Thereafter, the satellite transmitter 3620 may transmit the corresponding signals at the determined time point.

FIG. 37 is a block diagram illustrating the internal structure of a base station according to an embodiment of the disclosure. As illustrated in FIG. 37, a base station according to the disclosure may include a base station receiver 3700, a base station transmitter 3720, and a base station processor 3710. The base station may be a terrestrial base station or a part of the satellite. In an embodiment of the disclosure, the base station receiver 3700 and the base station transmitter 3720 may be commonly called a transceiver. The transceiver may transmit and receive a signal to and from the UE. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the base station processor 3710. Further, the transceiver may transmit the signal that is output from the base station processor 3710 on the radio channel. The base station processor 3710 may control a series of processes so that the base station can operate according to the above-described embodiment of the disclosure. For example, the base station processor 3710 may transmit RAR in advance in accordance with the configuration information configured by itself.

On the other hand, embodiments of the disclosure that are described in the specification and drawings are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. For example, the first embodiment and the fourth embodiment can be combined and applied. Further, other modified examples based on the technical idea of the above-described embodiments can be embodied in an LTE system and a 5G system.

The invention claimed is:

1. A method by a user equipment (UE) in a communication system, the method comprising:
   receiving, from a base station, information on a change rate of a timing advance (TA) or a frequency offset;
   identifying the timing advance or the frequency offset for an uplink transmission based on the information on the change rate of the timing advance or the frequency offset; and
   transmitting the uplink transmission to the base station by applying the identified timing advance or frequency offset,
   wherein the information on the change rate of the timing advance or the frequency offset includes information on a period and a time to which the change rate is applied, and
   wherein the timing advance for the uplink transmission is identified based on a first value commonly applied to UEs located within the same beam in determining the timing advance, and the commonly applied first value is received from the base station through system information.

2. The method of claim 1, wherein the frequency offset for the uplink transmission is determined based on a frequency unit that is identified in accordance with a subcarrier spacing.

3. The method of claim 1, wherein the frequency offset for the uplink transmission is identified based on a second value commonly applied to UEs located within the same beam in determining the frequency offset, and
   the commonly applied second value is received from the base station through system information.

4. A method by a base station in a wireless communication system, the method comprising:
   transmitting, to a user equipment (UE), information on a change rate of a timing advance (TA) or a frequency offset; and
   receiving, from the UE, an uplink transmission transmitted by applying the timing advance or the frequency offset identified based on the information on the change rate of the timing advance or the frequency offset,
   wherein the information on the change rate of the timing advance or the frequency offset includes information on a period and a time to which the change rate is applied, and
   wherein the timing advance for the uplink transmission is identified based on a first value commonly applied to UEs located within the same beam in determining the timing advance, and the commonly applied first value is transmitted to the UE through system information.

5. The method of claim 4, wherein the frequency offset for the uplink transmission is identified based on a frequency unit that is determined in accordance with a subcarrier spacing.

6. The method of claim 4, wherein the frequency offset for the uplink transmission is identified based on a second value commonly applied to UEs located within the same beam in determining the frequency offset, and
   the commonly applied second value is transmitted to the UE through system information.

7. A UE in a communication system, the UE comprising:
a transceiver; and
a controller configured to:
- receive, from a base station, information on a change rate of a timing advance (TA) or a frequency offset,
- identify the timing advance or the frequency offset for an uplink transmission based on the information on the change rate of the timing advance or the frequency offset, and
- transmit the uplink transmission to the base station by applying the identified timing advance or frequency offset, wherein the information on the change rate of the timing advance or the frequency offset includes information on a period and a time to which the change rate is applied and wherein the timing advance for the uplink transmission is identified based on a first value commonly applied to UEs located within the same beam in determining the timing advance, and the commonly applied first value is received from the base station through system information.

8. The UE of claim 7, wherein the frequency offset for the uplink transmission is identified based on a frequency unit that is determined in accordance with a subcarrier spacing.

9. The UE of claim 7, wherein the frequency offset for the uplink transmission is identified based on a second value commonly applied to UEs located within the same beam in determining the frequency offset, and the commonly applied second value is received from the base station through system information.

10. A base station in a communication system, the base station comprising:
a transceiver; and
a controller configured to:
- transmit, to a user equipment (UE), information on a change rate of a timing advance (TA) or a frequency offset, and
- receive, from the UE, an uplink transmission transmitted by applying the timing advance or the frequency offset identified based on the information on the change rate of the timing advance or the frequency offset, wherein the information on the change rate of the timing advance or the frequency offset includes information on a period and a time to which the change rate is applied, and wherein the timing advance for the uplink transmission is identified based on a first value commonly applied to UEs located within the same beam in determining the timing advance, and the commonly applied first value is transmitted to the UE through system information.

11. The base station of claim 10, wherein the frequency offset for the uplink transmission is identified based on a frequency unit that is determined in accordance with a subcarrier spacing.

* * * * *